United States Patent [19]
Sweere et al.

[11] Patent Number: 6,019,332
[45] Date of Patent: Feb. 1, 2000

[54] PIVOT/RATCHET ASSEMBLY AND SUPPORT SYSTEM

[75] Inventors: Harry C. Sweere, Minneapolis; Steve A. Nistler, Rosemount; Donald M. Voeller, Eagan; Dennis M. Scheller, Burnsville, all of Minn.

[73] Assignee: Ergotron, Inc., St. Paul, Minn.

[21] Appl. No.: 08/869,873

[22] Filed: Jun. 2, 1997

Related U.S. Application Data

[63] Continuation-in-part of application No. 08/660,397, Jun. 7, 1996, Pat. No. 5,842,672.

[51] Int. Cl.⁷ .............................. E04G 3/00; F16M 11/12
[52] U.S. Cl. .................................. 248/284.1; 248/292.12; 248/292.11; 248/280.11; 248/923
[58] Field of Search .......................... 248/292.12, 292.13, 248/291.1, 292.11, 284.1, 917, 918, 919, 920, 921, 922, 923, 276.1, 240, 242, 281.11, 280.11

[56] References Cited

U.S. PATENT DOCUMENTS

| | | | |
|---|---|---|---|
| 257,050 | 4/1882 | Munson | 248/291.1 X |
| D. 279,007 | 5/1985 | Empson et al. | D14/113 |
| D. 289,873 | 5/1987 | Gemmell et al. | D14/113 |
| D. 295,415 | 4/1988 | Thies et al. | D14/114 |
| D. 310,358 | 9/1990 | Nuttall et al. | D14/113 |
| D. 312,630 | 12/1990 | Esslinger | D14/113 |
| D. 313,405 | 1/1991 | Barry et al. | D14/113 |
| D. 317,912 | 7/1991 | Takai | D14/113 |
| D. 319,435 | 8/1991 | Brown | D14/113 |
| D. 326,847 | 6/1992 | Savio | D14/113 |
| D. 337,104 | 7/1993 | Orchard | D14/113 |
| D. 339,796 | 9/1993 | Goodner et al. | D14/113 |
| D. 344,933 | 3/1994 | Wiseman et al. | D14/113 |
| D. 348,449 | 7/1994 | Rodd et al. | D14/113 |
| D. 349,489 | 8/1994 | Wang | D14/113 |
| D. 354,052 | 1/1995 | Imai | D14/113 |
| D. 354,952 | 1/1995 | Rodd | D14/113 |
| D. 357,468 | 4/1995 | Rodd | D14/113 |
| 413,131 | 10/1889 | Chappell | 248/291.1 X |
| 3,750,918 | 8/1973 | Jensen . | |
| 4,350,098 | 9/1982 | Shirono et al. | 248/242 X |
| 4,365,561 | 12/1982 | Tellier et al. | 108/7 |
| 4,368,867 | 1/1983 | Pendleton et al. . | |
| 4,438,458 | 3/1984 | Munscher | 358/254 |
| 4,542,872 | 9/1985 | Marino et al. . | |
| 4,605,188 | 8/1986 | Goetz . | |

(List continued on next page.)

*Primary Examiner*—Ramon O. Ramirez
*Assistant Examiner*—Stephen S. Wentsler
*Attorney, Agent, or Firm*—Hugh D. Jaeger

[57] ABSTRACT

Multi-jointed and pivoted mounting systems for support of a flat panel video display and/or keyboard tray, incorporating a plurality of pivot points providing for pivotal motion of one or more components about a plurality of vertical and horizontal axes. Support arms having elevational pivot assemblies, including plastic friction washers and gas springs, offer elevational arm control requiring constant and predetermined positioning effort on the part of the video display operator and keyboard operator.

35 Claims, 35 Drawing Sheets

U.S. PATENT DOCUMENTS

| | | |
|---|---|---|
| 4,616,218 | 10/1986 | Bailey et al. . |
| 4,691,886 | 9/1987 | Wendling et al. . |
| 4,729,533 | 3/1988 | Hillary et al. . |
| 4,768,744 | 9/1988 | Leeds et al. . |
| 4,834,329 | 5/1989 | Delapp . |
| 4,836,478 | 6/1989 | Sweere . |
| 4,836,486 | 6/1989 | Vossoughi et al. . |
| 4,846,434 | 7/1989 | Krogsrud . |
| 4,852,842 | 8/1989 | O'Neill . |
| 4,919,387 | 4/1990 | Sampson ................................. 248/921 |
| 4,953,822 | 9/1990 | Sharber et al. . |
| 4,989,813 | 2/1991 | Kim et al. . |
| 4,997,031 | 3/1991 | Kashiwada et al. . |
| 5,005,669 | 4/1991 | Umebara et al. ................... 248/397 X |
| 5,016,849 | 5/1991 | Wu . |
| 5,034,858 | 7/1991 | Kawamoto et al. . |
| 5,049,862 | 9/1991 | Dao et al. . |
| 5,082,352 | 1/1992 | Kawagishi et al. . |
| 5,085,394 | 2/1992 | Torii ........................................ 248/455 |
| 5,088,676 | 2/1992 | Orchard et al. ......................... 248/421 |
| 5,092,552 | 3/1992 | Dayton et al. . |
| 5,160,098 | 11/1992 | Durkos . |
| 5,168,429 | 12/1992 | Hosoi . |
| 5,173,686 | 12/1992 | Fujihara . |
| 5,193,069 | 3/1993 | Furuya . |
| 5,209,448 | 5/1993 | Hatanaka et al. ....................... 248/455 |
| 5,249,103 | 9/1993 | Forsythe . |
| 5,250,888 | 10/1993 | Yu . |
| 5,255,214 | 10/1993 | Ma . |
| 5,292,097 | 3/1994 | Russell ............................. 248/281.11 |
| 5,329,289 | 7/1994 | Sakamoto et al. . |
| 5,335,142 | 8/1994 | Anderson . |
| 5,345,362 | 9/1994 | Winkler . |
| 5,375,076 | 12/1994 | Goodrich et al. . |
| 5,379,182 | 1/1995 | Fujimori et al. . |
| 5,400,993 | 3/1995 | Hamilton . |
| 5,410,447 | 4/1995 | Miyagawa et al. . |
| 5,630,648 | 5/1997 | Allard et al. ............................ 297/327 |
| 5,738,316 | 4/1998 | Sweere et al. ..................... 248/920 X |
| 5,743,503 | 4/1998 | Voeller et al. ..................... 248/920 X |

PIVOT/RATCHET ASSEMBLY AND SUPPORT SYSTEM

CROSS REFERENCE TO CO-PENDING APPLICATIONS

This patent application is a continuation-in-part (CIP) of U.S. Ser. No. 08/660,397 filed Jun. 7, 1996, now U.S. Pat. No. 5,842,672, entitled "Mounting System for Flat Panel Display, Keyboard, and Stand" by the same inventors.

BACKGROUND OF THE INVENTION

1. Field of the Invention

The present invention is for mounting systems incorporating a positionable support arm, and more particularly pertains to mounting systems used for supporting a flat panel display in position for viewing or a keyboard in position for operating.

2. Description of the Prior Art

Prior art mounting systems with positionable support arms have incorporated ball gimbals, simple knob operated pivot mounts, angular slots, and control arms or spring devices which were adjusted to maintain position of a flat panel display supported thereby while offering pivotable capabilities about a small number of pivot centers. Often the lack of a sufficient amount of pivots limited the positionable capabilities of the support arm and the flat panel display about a sufficient number of pivotal axes. Lack of friction control and dynamic lift capability made adjustment of the flat panel display difficult and required the use of two hands to accomplish an adjustment. Additionally, movement of the support arm and flat panel display payload in a downward direction against a friction pivot style joint generally was accomplished easily, as the weight of the flat panel display acted in conjunction with gravitational forces and readily overcame the frictional qualities of the friction pivot style joint. However, movement in an upward direction was not so easily and readily accomplished, as the upward force required to raise the flat panel display had to overcome the friction of the friction style joint as well as the force of gravity. In addition, two-handed adjustments added to the complexity of adjusting the flat panel display. Clearly what is needed is a positional flat panel display mounting system which is positionable over a multitude of axes, which can be repositioned without secondary controls, which incorporates an adjustable counterbalance or lifting system to provide "co-equal" movement force in either the upward or downward direction, which incorporates frictional systems which can be used to establish pre-determined moving forces within OSHA guidelines, and which provides stability for touch screen applications.

SUMMARY OF THE INVENTION

The general purpose of the present invention is a multi-jointed and pivoted mounting system for support and positioning of a flat panel display or a keyboard.

According to one embodiment of the present invention, there is provided a multi-jointed and pivoted mounting system for positioning of a flat panel display including: a pivotal support bracket, a support arm, an arm azimuthal pivot, an arm elevational pivot, an adjustable load counterbalance system, a display roll pivot, a display tilt pivot, a display rotation pivot, and an interface coupling, all acting in concert to support and provide positioning for a flat panel display or any other desired object, such as a keyboard.

A frictional pivot mount forms the basis of each pivot and is an unique tilt resistive or tilt restraining device that relies on the unique properties of a family of polymer materials having static and dynamic coefficients of friction which are substantially identical, such as Delrin or other ultra high molecular weight polyethylene (UHMWPE) materials. The result provided by the static and dynamic coefficients of friction of UHMWPE materials, such as utilized in disks or washers of the unique frictional pivot tilt restraining device, is that a flat panel display remains in any tilt position selected by the user. If the user wishes to tiltingly reposition the flat panel display upwardly or downwardly, or any other position, the flat panel display must be manually repositioned to overcome the frictional pivot tilt restraining device. Once the flat panel display is tilted to a different selected position, the unique frictional pivot tilt restraining device resistably restrains the flat panel display in the new position as selected. Sufficient friction to maintain position of the flat panel display during use is provided, and yet easy "breakaway" release to reposition the flat panel display to a new operating position or to the storage position is afforded. The unique characteristics of the polymer material allow smooth tilt adjustment of the frictional pivot tilt mechanism, and yet provide a constant frictional memory for the preset position of the flat panel display. A predetermined poise is required of the operator to reposition the flat panel display, at which time it remains in the new position.

One significant aspect and feature of the present invention is a multi-jointed and pivoted mounting system for a flat panel display.

Another significant aspect and feature of the present invention is a multi-jointed and pivoted mounting system for a flat panel display which is positionable at any point within the given range of travel of a support arm.

Yet another significant aspect and feature of the present invention is a plurality of pivots incorporating ultra high molecular weight polyethylene (UHMWPE) disks or washers (the subject of a pending patent application).

Still another significant aspect and feature of the present invention is a plurality of pivots including an arm azimuthal pivot, an arm elevational pivot, a display roll pivot, a display tilt pivot and a display rotation pivot.

A further significant aspect and feature of the present invention is an interface connecting the display rotation pivot to the display tilt pivot.

A still further significant aspect and feature of the present invention is a load counterbalance mechanism adjuster whose location and angle of adjustment in respect to the arm elevational pivot is derived through the use of a computerized mathematical algorithm for each mounting option offered in the system, to provide a user adjustable counterbalance pivot point for a broad range of display or payload weights.

A still further significant aspect and feature of the present invention is a load counterbalance mechanism which provides a dynamically increasing counterbalance moment which corresponds to the increasing moment load on the support arm as the support arm traverses from 0° vertical to 90° horizontal and which provides a dynamically decreasing counterbalance moment which corresponds to the decreasing moment load on the support arm as the support arm moves downward from 90° horizontal to 180° vertical to provide a linear counterbalance force throughout the total adjustable range of the support arm.

A still further significant aspect and feature of the present invention is a nitrogen gas spring counterbalance mechanism which operates physically within the pivot point of the support arm, allowing 180° (±90°) rotation of the flat panel display or other load.

A still further significant aspect and feature of the present invention is an arm elevation frictional pivot, independent of the arm counterbalance system, which provides for establishment of a predetermined bi-directional frictional moving force which allows single-handed movement of the flat panel display within OSHA guidelines and yet provides a stable viewing or operating platform for touch screen or keyboard applications.

Another significant aspect and feature of the present invention is a pivot/ratchet assembly which attaches a keyboard tray to the outer end of a support arm. The pivot/ratchet assembly offers incremental pivotal positioning in an upward direction about arrays of ratchet teeth and includes a release lever assembly which is utilized to bypass the ratcheting feature to allow manual repositioning for downward positioning of the keyboard tray. The pivot/ratchet assembly can also be incorporated to support a flat panel display.

Having thus described significant aspects and features of the present invention, it is the principal object of the present invention to provide a multi-jointed and pivotable mounting system for a flat panel video display or a keyboard.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
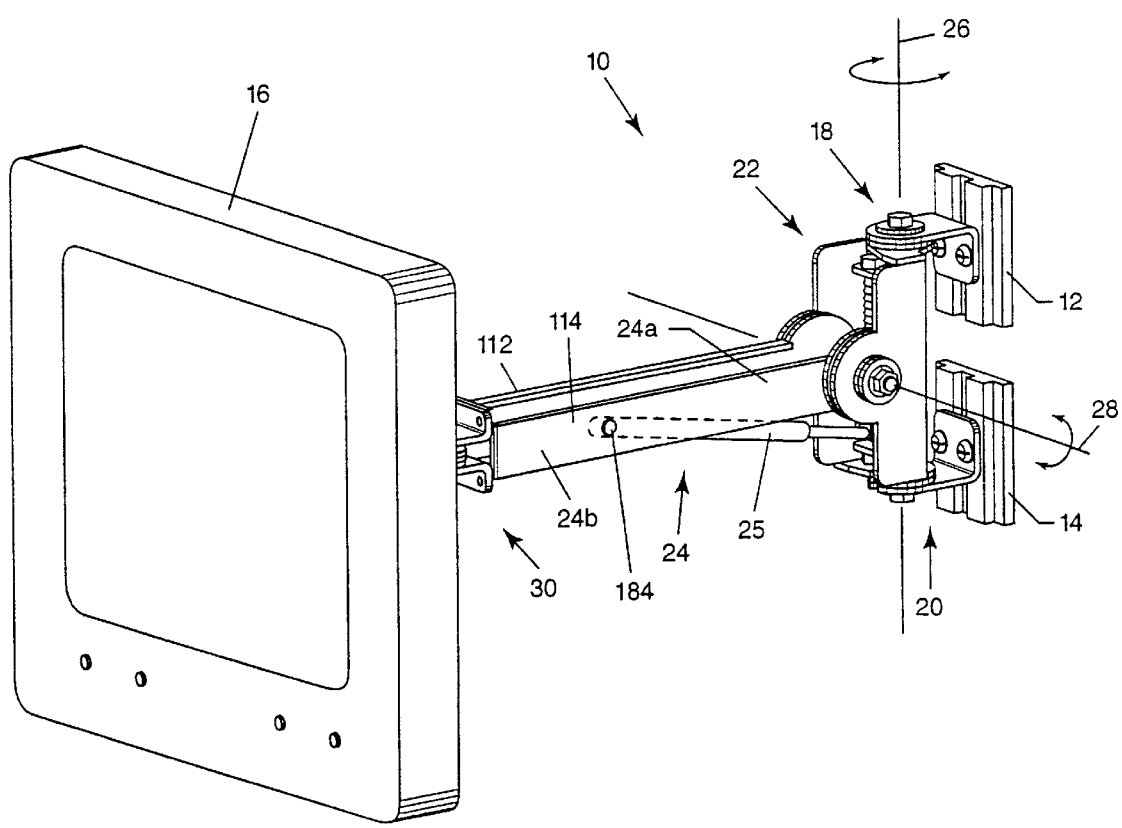
FIG. 1 illustrates a perspective view of a mounting system embodiment according to the present invention in the form of a vertical surface mount for supporting a flat panel display, and also illustrates a flat panel display supported thereby.

FIG. 1 illustrates a perspective view of a mounting system embodiment according to the present invention in the form of a vertical surface mount 10 and supporting a flat panel display 16. Angled bracket assemblies 18 and 20 secure suitably to surface mount track plates 12 and 14 to support a pivotal support bracket or arm elevation bracket 22 and its associated components. Pivotal support bracket 22 serves as a pivotal mount for support arm 24 and other associated components including a gas (e.g., nitrogen) spring 25 and left and right support arm members 112 and 114, respectively. Gas spring 25 secures between the pivotal support bracket 22 and the support arm 24, as later described in detail. The pivotal support bracket 22 pivots about vertical axis 26 to carry the support arm 24, a three-axis pivot 30, and the flat panel display 16 as a unit about the vertical axis 26. Support arm 24 pivotally secures to the pivotal support bracket 22 to offer movement of the support arm 24, the three-axis pivot 30, and the flat panel display 16 as a unit about the horizontal axis 28. The three-axis pivot 30, as described later in detail, secures at the outboard end 24b of the support arm 24 to support the flat panel display 16.

Figure 2:
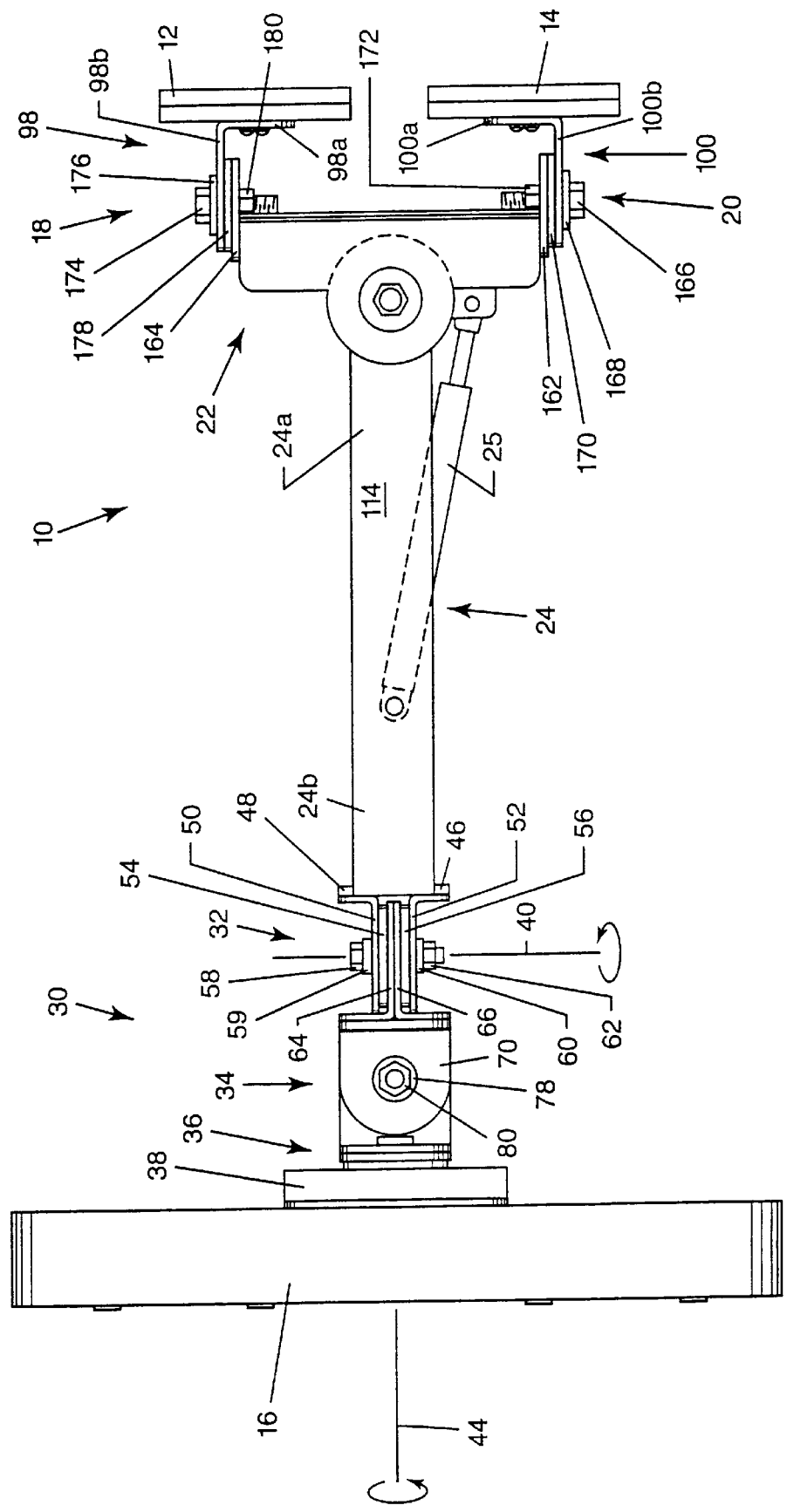
FIG. 2 illustrates a side view of the elements illustrated in FIG. 1.
Figure 4:
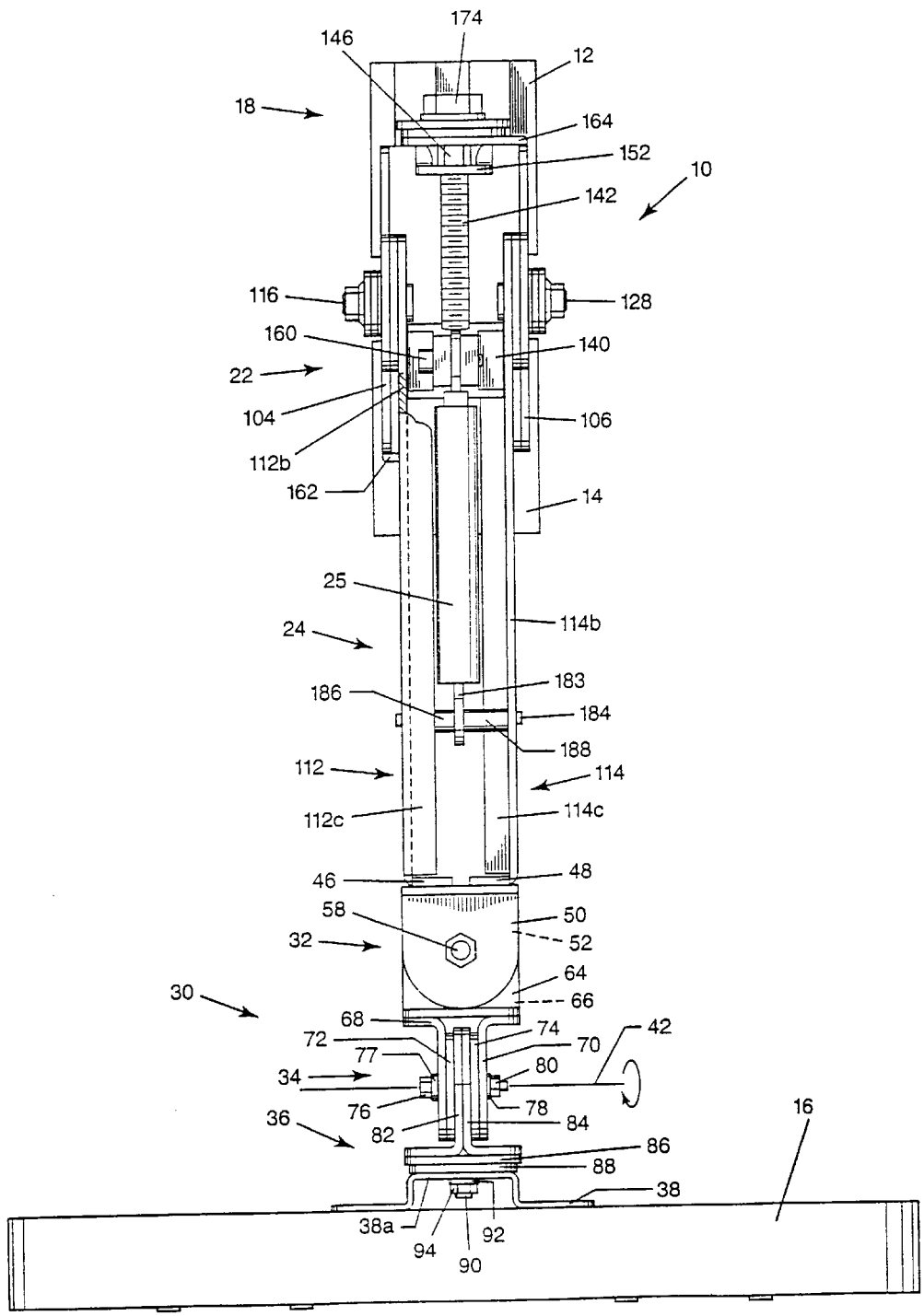
FIG. 4 illustrates a front view of the elements illustrated in FIG. 1 with the support arm of the vertical surface mount in the fully lowered position.

FIG. 2 illustrates a side view of the elements of FIG. 1. Illustrated in particular is the three-axis pivot 30 including pivot assemblies 32, 34 and 36 suitably secured between the outboard end 24b of support arm 24 and a component mount or bracket 38 on the rear surface of the flat panel display 16. The inboard end 24a of the support arm is pivotally secured to the pivotal support bracket 22 to provide elevational pivotal positioning of the support arm 24 and its payload about the horizontal axis 28 illustrated in FIG. 1. The three-axis pivot 30 and the flat panel display 16 can be elevationally positioned about the horizontal axis 28 in conjunction with and by the action of the support arm 24. As viewed in FIG. 2, pivot assembly 32 offers rotation of the members outboard of the pivot assembly 32, that is to say, pivot assemblies 34, 36 and flat panel display 16, about the vertical axis 40 extending through the pivot assembly 32. Pivot assembly 34 offers tilt of the members outboard of the pivot assembly 34, that is to say, pivot assembly 36 and flat panel display 16, about a horizontally aligned axis 42 extending through the pivot assembly 34, as illustrated in FIG. 4. Pivot assembly 36 offers roll of the members outboard of the pivot assembly 36, that is to say, flat panel display 16, about a roll axis 44 extending through the pivot assembly 36.

The pivot assembly 32, of the three-axis pivot 30, secures to vertically oriented flanges 46 and 48 extending from members of the support arm 24.

Now, with reference to FIGS. 2 and 4 the three-axis pivot 30 is described. Pivot assembly 32 includes angle brackets 50 and 52 secured to support arm flanges 46 and 48 at end 24b of the support arm 24, UHMWPE (ultra high molecular weight polyethylene) disks 54 and 56 aligned to the inner planar surfaces of angle brackets 50 and 52, respectively, and a bolt 58 having two Belleville washers 59 and 60 and nut 62. Aligned to the interior surfaces of the UHMWPE disks 54 and 56 are the horizontally aligned portions of angle brackets 64 and 66 which extend outwardly to present the flanged portions for mating to pivot assembly 34. Bolt 58 extends through the brackets 50, 52, 64 and 66, UHMWPE disks 54 and 56, Belleville washers 59 and 60 and nut 62. Bolt 58 is tensioned across the assembly to provide suitable friction to stabilize pivot assemblies 34 and 36 and flat panel display 16. Pivot assembly 34, constructed in the same manner and fashion as pivot assembly 32, includes angle brackets 68 and 70 secured to the vertical portions of angle brackets 64 and 66 of the pivot assembly 32, UHMWPE disks 72 and 74 aligned to the inner surfaces of angle brackets 68 and 70, respectively, and a bolt 76 having two Belleville washers 77 and 78 and nut 80. Aligned to the interior surfaces of the UHMWPE disks 72 and 74 are the vertically aligned portions of angle brackets 82 and 84 which extend outwardly to present the flanged portions for mating to pivot assembly 36. Bolt 76 extends through the brackets 68, 70, 82 and 84, UHMWPE disks 72 and 74, Belleville washers 77 and 78 and nut 80. Bolt 76 is tensioned across the assembly to provide suitable friction to stabilize pivot assembly 36 and flat panel display 16, preventing the pivot assembly 36 from falling due to its weight. The frictional tension is adjustable to accommodate various weights of flat panel displays. Pivot assembly 36 includes a plate 86 suitably secured to the flanges of the angle brackets 82 and 84, a UHMWPE disk 88, a planar portion 38a of bracket 38, a bolt 90, a Belleville washer 92 and a nut 94. Bolt 90 extends through the plate 86, UHMWPE washer 88, planar portion 38a, Belleville washer 92 and nut 94, and is adjusted to provide tension across the assembly to provide suitable friction.

It can be appreciated that an almost infinitesimal number of positionings of the flat panel display 16 are available incorporating the three-axis swiveling of the flat panel display 16 at the three-axis pivot 30 and the horizontal and elevational positionability provided by the pivotal support bracket 22. In each case it can be appreciated that the flat panel display 16 must be adjustable and yet stay in the position selected by the user. If the user wishes to tiltingly reposition the flat panel display 16 upwardly, downwardly, left to right or in a circular plane, the flat panel display 16 must be manually repositioned to overcome the friction imposed by pivot assemblies 32, 34 and 36. Once the flat panel display 16 is moved to a different selected position, the unique tilt restraining devices inherent in pivot assemblies 32, 34 and 36 will resistably restrain the flat panel display 16 in the new position as selected. Sufficient friction to maintain position of the flat panel display 16 during use is provided but easy "breakaway" release to reposition the flat panel display 16 to a new operating position or to a storage position is afforded. The unique characteristics of the polymer material UHMWPE disks 54, 56, 72, 74 and 88 combined with pressure supplied by Belleville washers 59, 60, 77, 78 and 92 allow smooth adjustment of the flat panel display 16 and yet provide a constant frictional memory for the present position of the flat panel display 16. A predetermined poise is required of the operator to reposition the flat panel display 16, at which time it remains in the new position. Each pivot point is also adjustable to accommodate various flat panel displays and different length arms.

Figure 3:
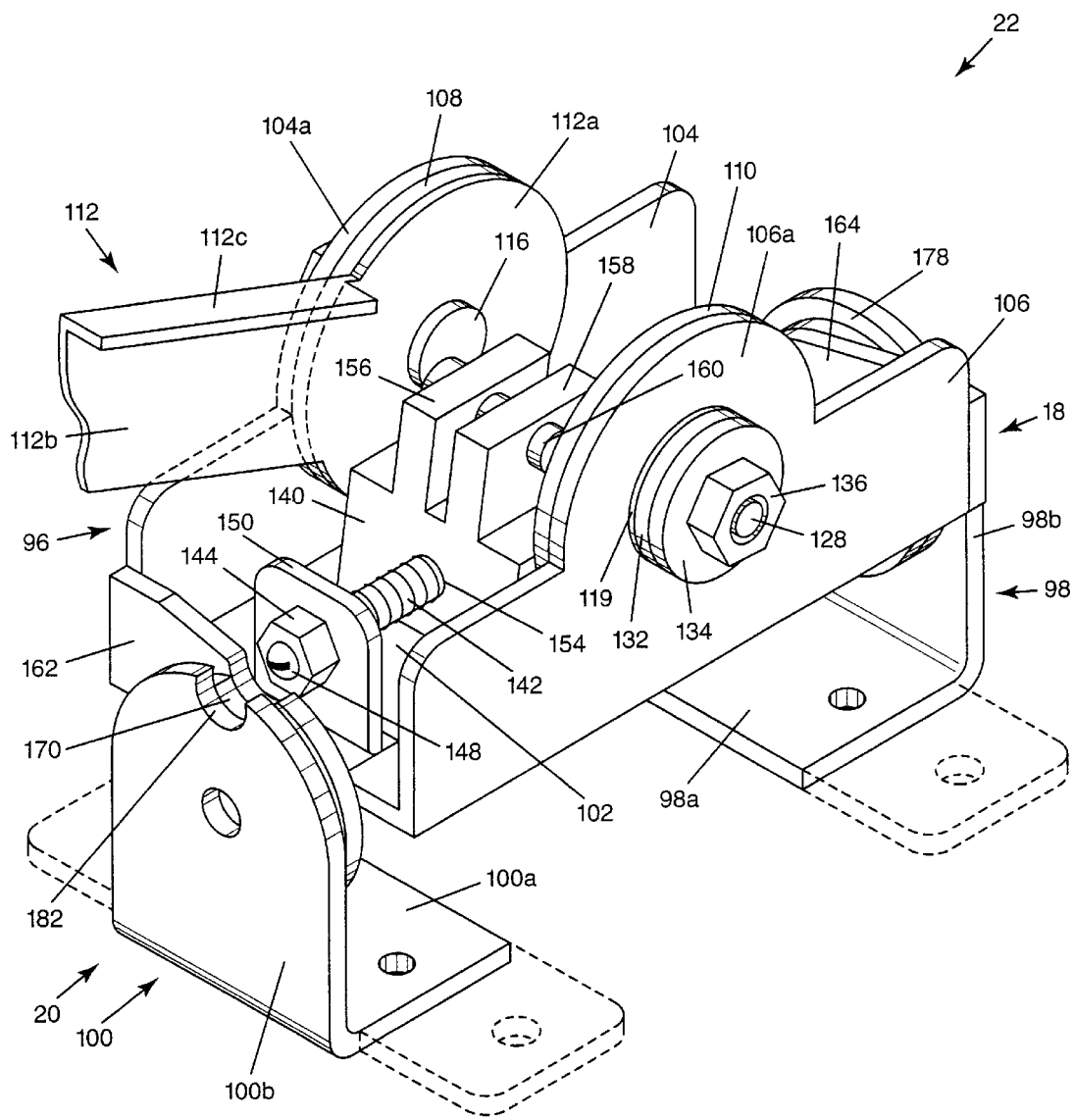
FIG. 3 illustrates a rotated isometric view of the pivotal support bracket of the vertical surface mount of FIG. 1.
Figure 5:
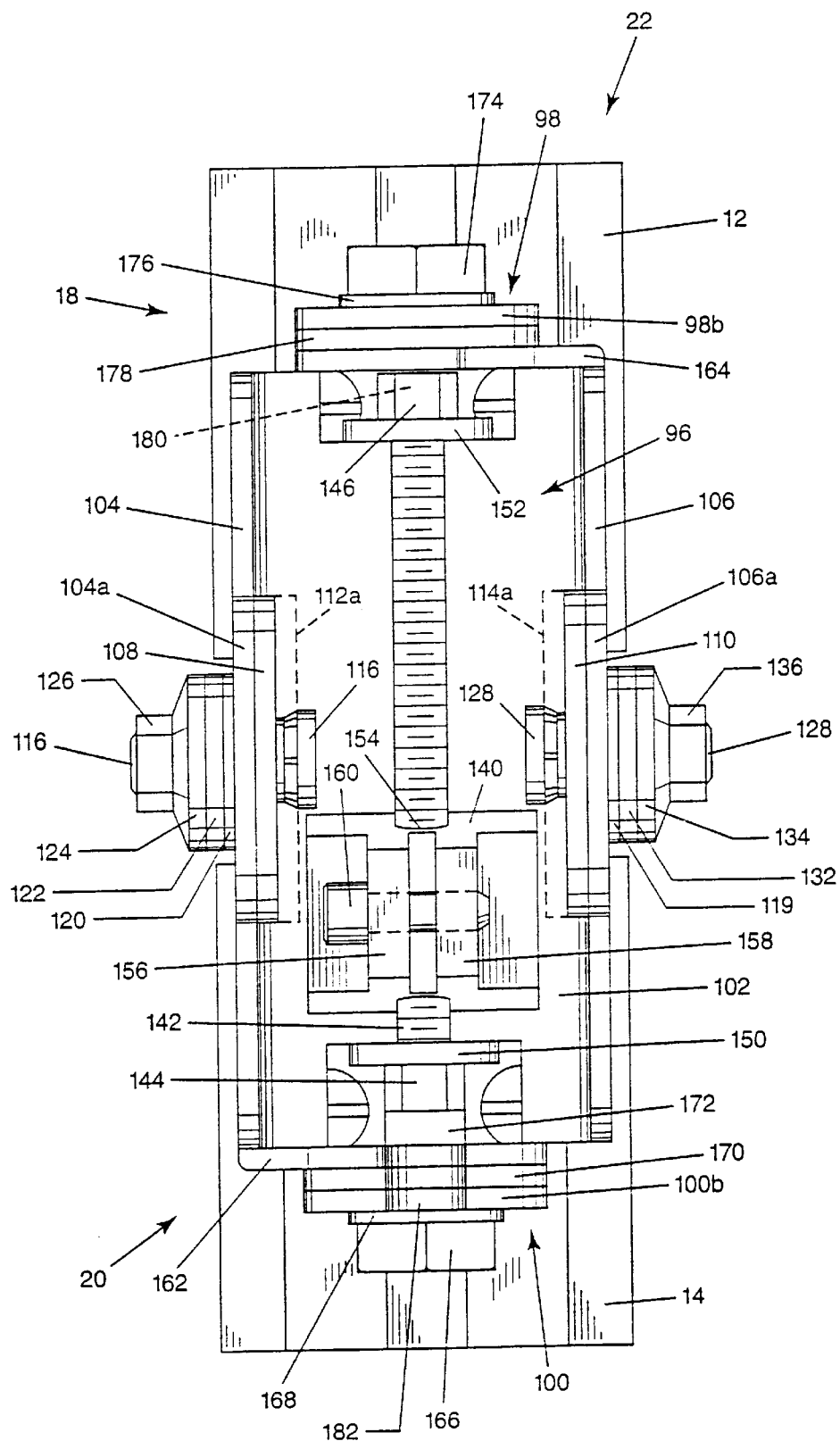
FIG. 5 illustrates a front view of the pivotal support bracket of FIG. 3 secured to the wall mount track plates of the vertical surface mount of FIG. 1.
Figure 6:
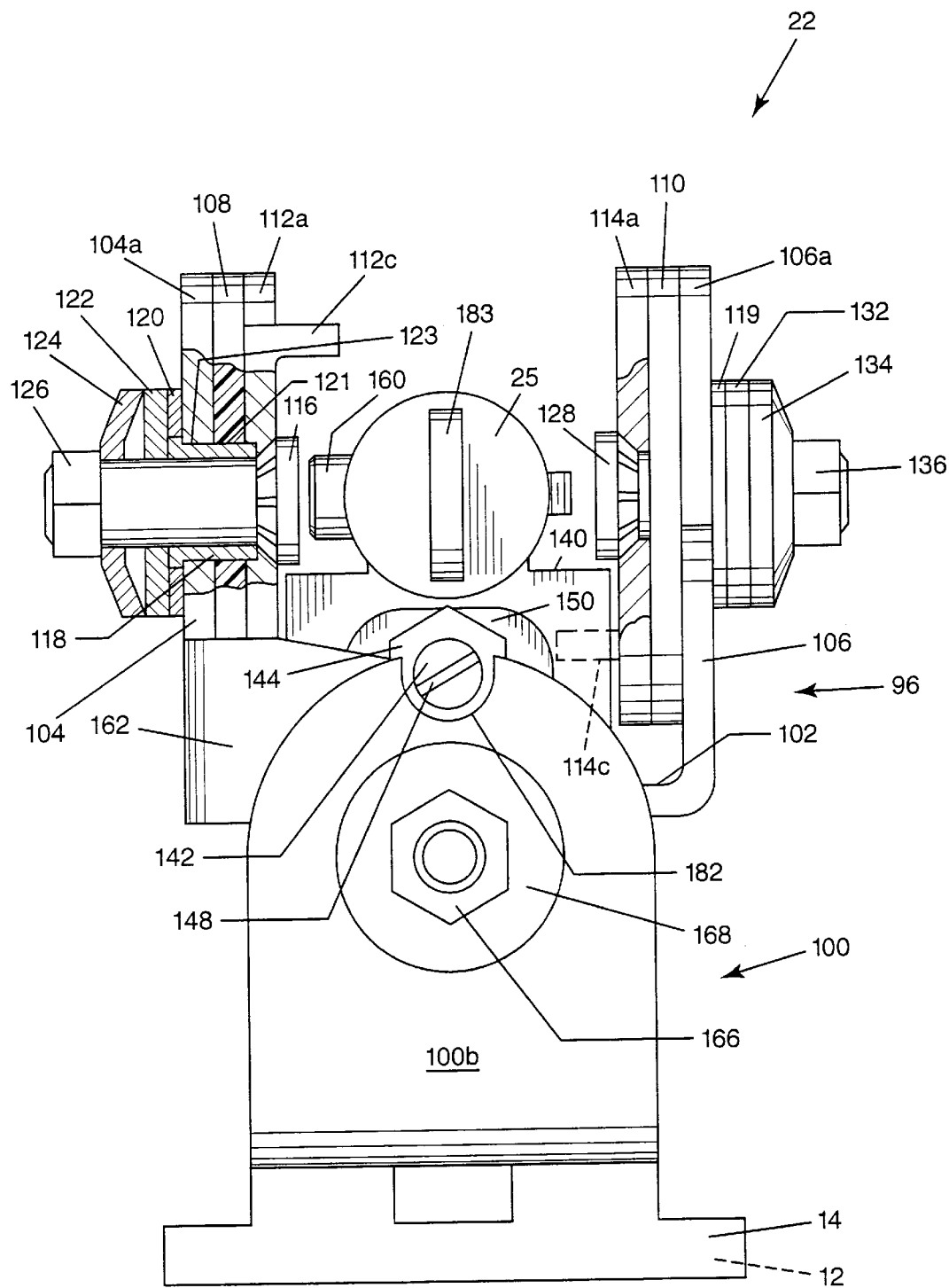
FIG. 6 illustrates a bottom view in partial cross section of the elements illustrated in FIG. 5.
Figure 7:
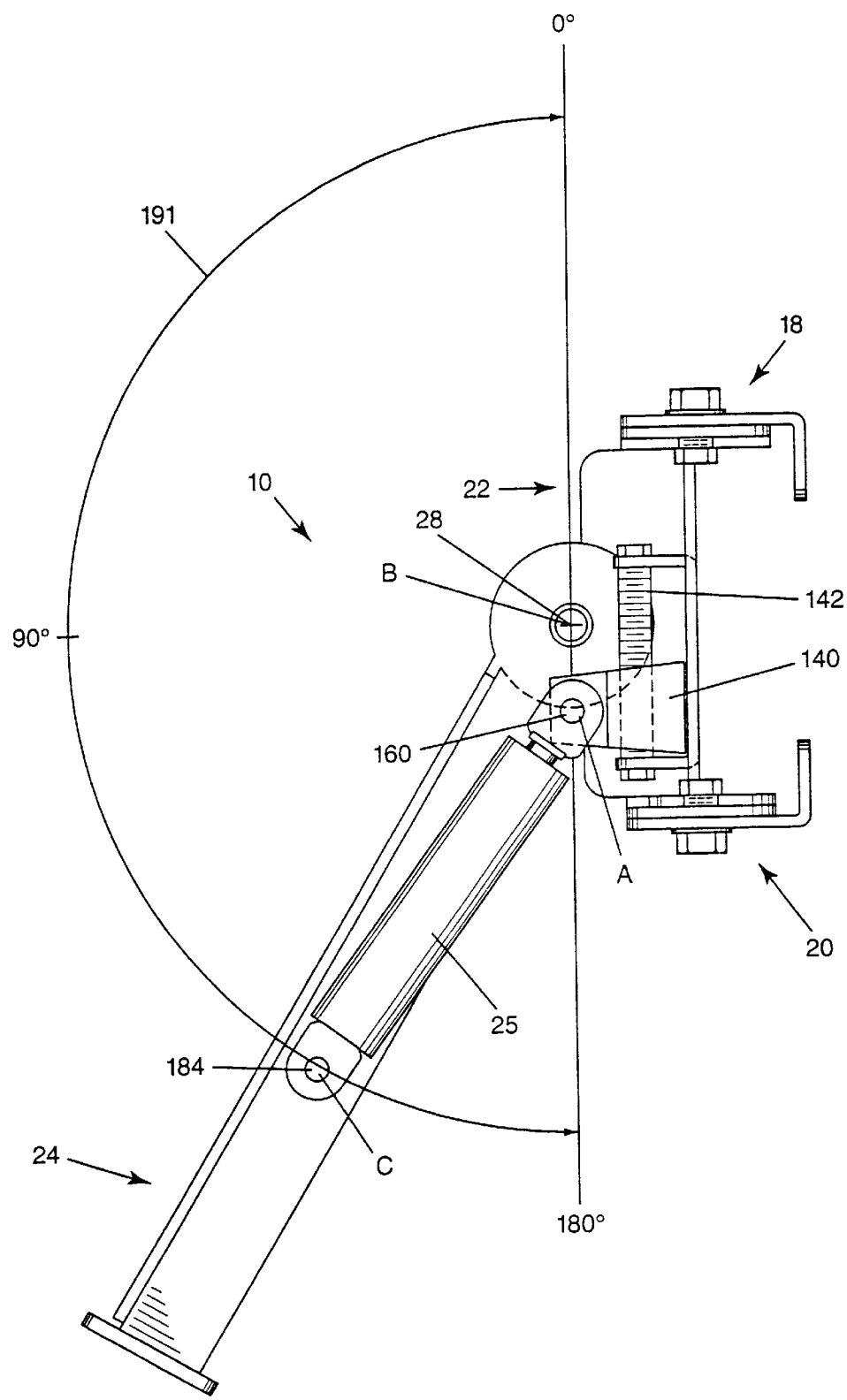
FIG. 7 illustrates a partial cutaway side view of the vertical surface mount of FIG. 1 with the support arm in a downward position along its 180° pivot range about a horizontal axis.
Figure 8:
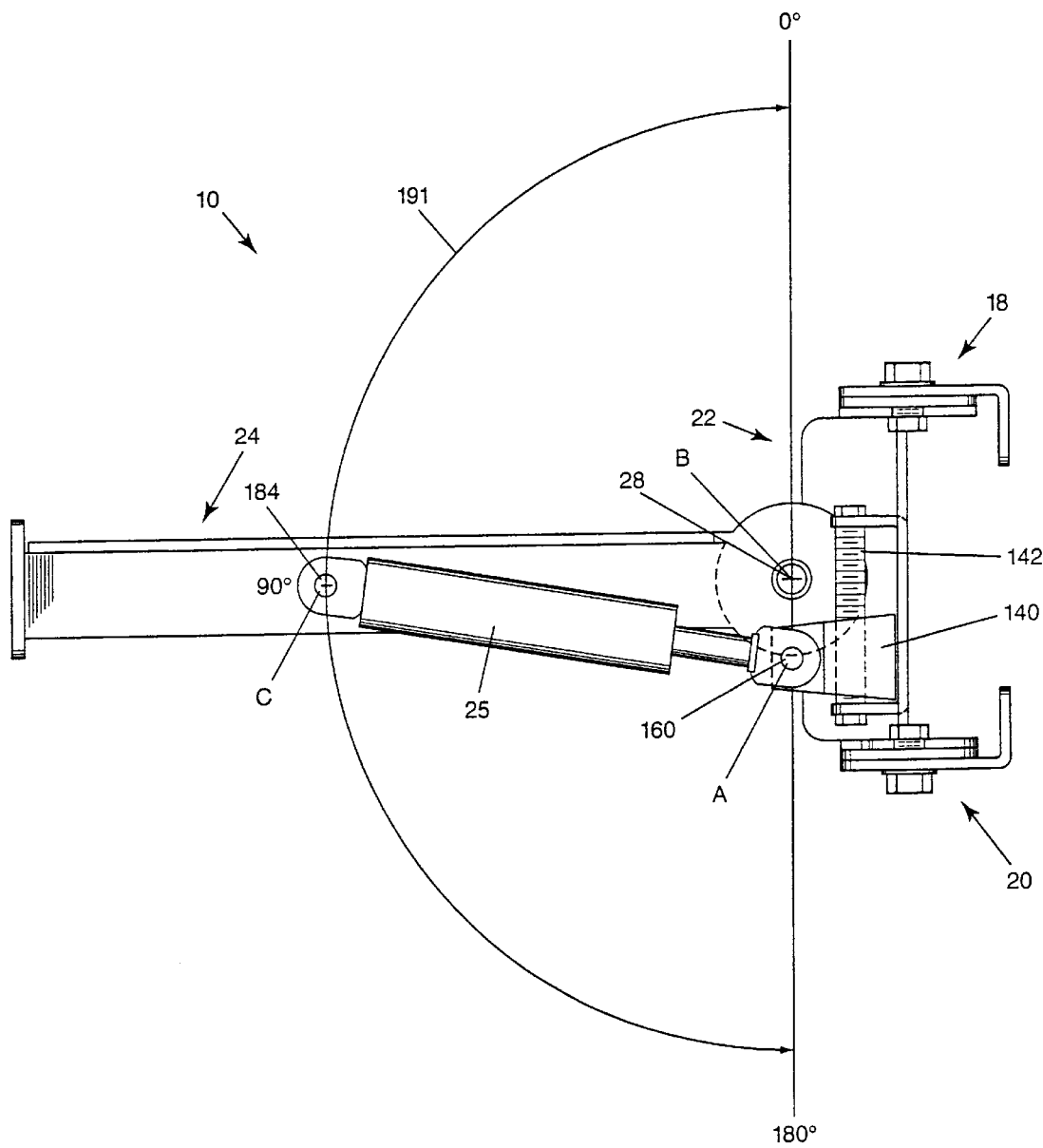
FIG. 8 illustrates a partial cutaway side view of the vertical surface mount of FIG. 1 with the support arm in the 90° or horizontal position along its 180° pivot range about a horizontal axis.
Figure 9:
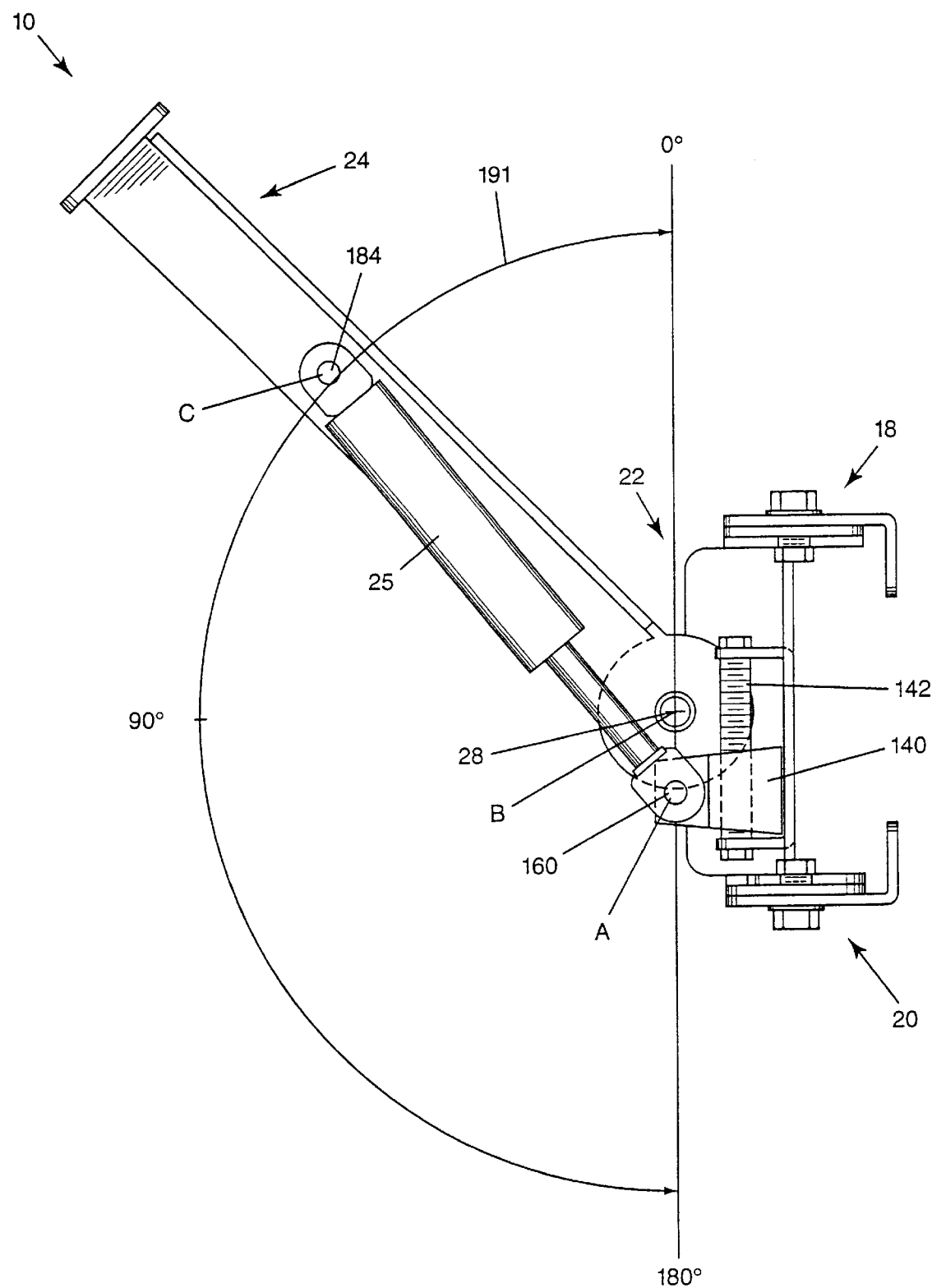
FIG. 9 illustrates a partial cutaway side view of the vertical surface mount of FIG. 1 with the support arm in an upward position along its 180° pivot range about a horizontal axis.
Figure 10:
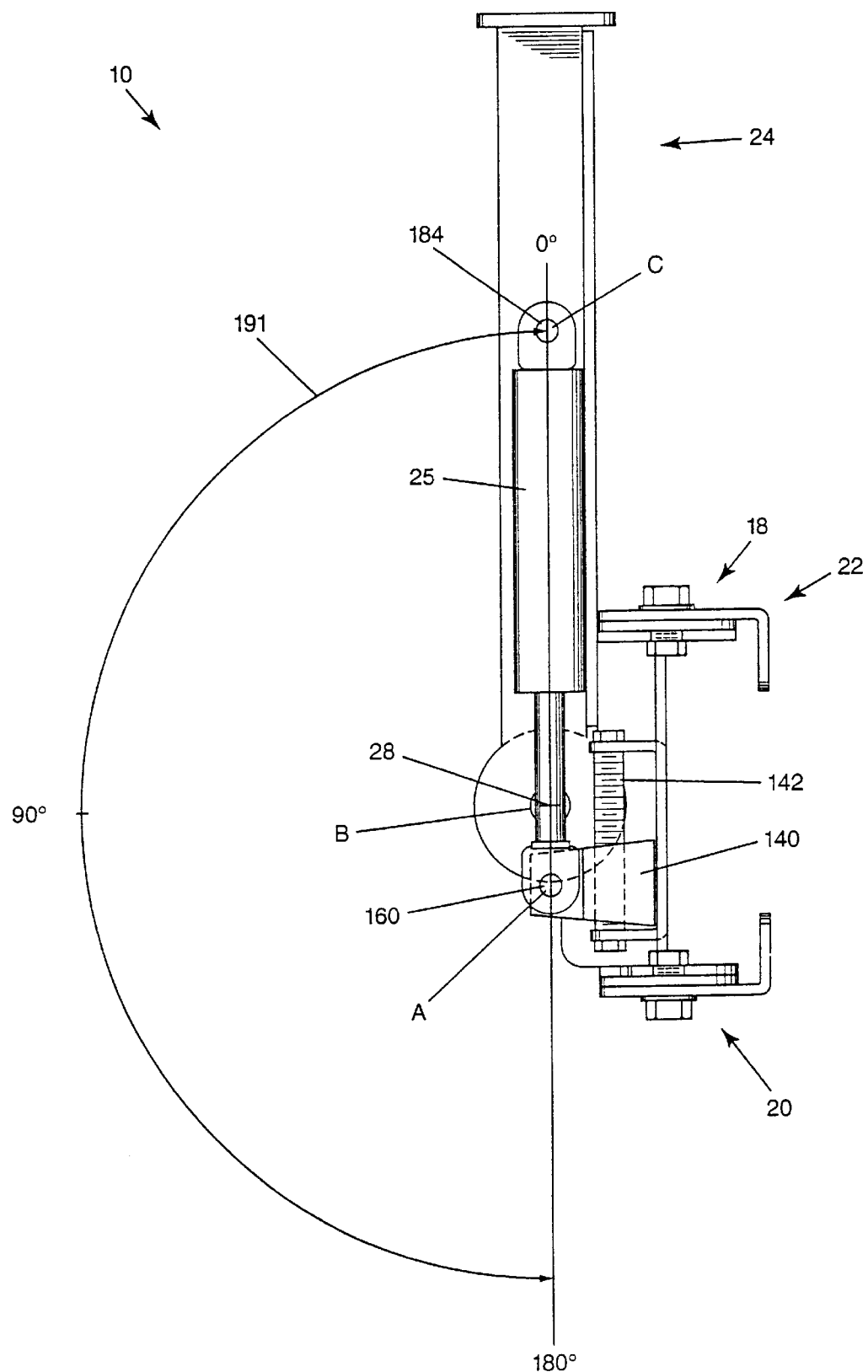
FIG. 10 illustrates a partial cutaway side view of the vertical surface mount of FIG. 1 with the support arm in its uppermost position along its 180° pivot range about a horizontal axis.

FIG. 3 illustrates a rotated isometric view of the pivotal support bracket 22, FIG. 5 illustrates a front view of the pivotal support bracket 22 secured to the track plates 12 and 14, and FIG. 6 illustrates a bottom view in partial cross section of the pivotal support bracket 22 secured to the track plates 12 and 14. With reference to FIGS. 3, 5 and 6, the pivotal support bracket 22 is now described. The pivotal support bracket 22 includes a central bracket 96 pivotally suspended between angled support brackets 98 and 100, which are part of angled bracket assemblies 18 and 20. Angled support brackets 98 and 100 include planar portions 98a and 100a, respectively, for mounting to the track plates 12 and 14, illustrated in FIG. 1. Planar portions 98a and 100a may be manufactured with extra length, as illustrated by dashed lines in FIG. 3, for mounting to a wall, a plate, a machine or other such surfaces. Planar portions 98b and 100b, each having a rounded edge, extend at right angles from the planar portions 98a and 100a and pivotally secure to the central bracket 96, as later described in detail.

The central bracket 96 includes a central planar area 102 having planar members 104 and 106 extending at right angles therefrom. Extending further from the planar members 104 and 106 are contiguous semi-circular members 104a and 106a, respectively, which align to UHMWPE disks 108 and 110 in concert with planar members 104 and 106. Support arm 24, illustrated in FIG. 1, includes a left support arm member 112 and a right support arm member 114. Referring to FIG. 3, left support arm member 112 includes a disk-like portion 112a corresponding to the size of the UHMWPE disk 108. A planar member 112b having a flange 112c extends from the disk-like portion 112a to form part of the support arm 24. Right support arm member 114 is not shown in FIG. 3 for purposes of brevity and clarity. However, as can be seen from FIGS. 4 and 6, right support arm member 114 is similar to left support arm member 112 and includes a disk-like portion 114a corresponding to the size of UHMWPE disk 110 and a planar member 114b having a flange 114c and extending from the disk-like portion 114a to form the other part of the support arm 24. Flanges 112c and 114c also act as stops on pivot tabs 162 and 164, stopping the support arm 24 at a ±90° rotation. FIG. 5 illustrates disk-like portions 112a and 114a of left and right support arm members 112 and 114 in dashed lines. FIG. 6 illustrates the left and right support arm members 112 and 114 in the down position, but shows the full disk-like portion 112a (partially in cross section) and a cutaway view of the disk-like portion 114a for purposes of brevity and clarity. A captive stud 116 secures in the disk-like portion 112a of the left support arm member 112 and extends through an oilite bearing 118 and accompanying oilite washer 120 assembly centered about and along holes 121 and 123 in the UHMWPE disk 108 and the planar member 104, respectively, through a steel washer 122, a Belleville washer 124 and a nut 126. Nut 126 is adjusted to provide tension across the assembly to provide a predetermined suitable friction to stabilize the left support arm member 112, pivot assembly, and the flat panel display 16 (not shown). The weight of the flat panel display 16 is counterbalanced by gas spring 25. In a similar fashion, a captive stud 128 secures in the disk-like portion 114a of the right support arm member 114 and extends through an oilite bearing (not shown, but similar to oilite bearing 118) and accompanying oilite washer 119 assembly centered about and along holes in the UHMWPE disk 110 and the planar member 106, through a steel washer 132, a Belleville washer 134, and a nut 136. A nut 136 is adjusted to provide tension across the assembly to provide a predetermined suitable friction to stabilize the right support arm member 114, pivot assembly, and the flat panel display 16 (not shown).

A predetermined frictional force is thus established to ensure that the vertical motion of support arm 24 remains in any position selected by the user. If the user wishes to reposition the flat panel display 16 upwardly or downwardly, the flat panel display 16 must be manually repositioned to overcome the support arm rotational friction established above. Once the flat panel display 16 is moved to a different selected position, the unique friction devices will resistably restrain the flat panel display 16 in its new position as selected. Sufficient friction to maintain position of the flat panel display 16 during use is provided but easy "breakaway" release to reposition the flat panel display 16 to a new operating position or to a storage position is afforded.

The unique characteristics of the polymer UHMWPE disks 108 and 110 in combination with a spring force supplied by Belleville washers 124 and 134 allow smooth adjustment of the flat panel display 16 and yet provide a constant frictional memory for the preset position of the flat panel display 16. A predetermined poise is required of the operator to move the flat panel display 16, at which time it remains in the new position. This predetermined vertical positioning force is established and functions independently of the support arm 24 payload counterbalance, which is performed by an adjustable gas spring assembly described below.

A positionable and adjustable gas spring mount 140 is adjustably mounted to adjustably slide along the central planar area 102 as positioned by a threaded shaft 142 having nuts 144 and 146 affixed at opposing ends. A slot 148 at the lower end of the threaded shaft 142 provides for rotational adjustability of the threaded shaft 142 and thus the gas spring mount 140 along the central planar area 102. The angle of central planar area 102 and thus the angle of threaded adjustment shaft 142 in relation to the support arm 24 horizontal pivot axis 28, as shown in FIG. 1, is predetermined by a computerized mathematical algorithm for each mounting option or weight to provide a user adjustable optimum counterbalance force pivot position corresponding to the specific weight of the flat panel display 16 mounted on support arm 24. See FIGS. 18, 19 and 23 for examples of threaded shafts 342, 424 and 642 (each corresponding to threaded shaft 142) set at different adjustment angles for each mounting option. It should be noted that positionable and adjustable gas spring mount 140 is positionable in the space between left support arm member 112 and right support arm member 114 up to and intersecting with the support arm 24 horizontal axis 28, as shown in FIG. 1, allowing the support arm 24 to rotate and counterbalance a variable payload in a range of 0° to 180°. Tabs 150 and 152 extend outwardly from the central planar area 102 to support the ends of the threaded shaft 142 by means of holes located in the tabs 150 and 152 through which the threaded shaft 142 passes. A threaded hole 154 central to the gas spring mount 140 accommodates the threaded shaft 142 for purposes of adjustment of the gas spring mount 140. Gas spring mount 140 also includes opposed tabs 156 and 158. A pivot bolt 160 passes through the opposed tabs 156 and 158 to serve as a mount for one end of the gas spring 25. The outboard end 183 of the gas spring 25 secures to a pivot pin 184 passing through left and right support arm members 112 and 114 and plastic spacers 186 and 188, as illustrated in FIG. 4.

The load counterbalance mechanism provides a dynamically increasing counterbalance moment which corresponds to the increasing moment load on the support arm 24 as the support arm 24 traverses from 0° vertical to 90° horizontal and provides a dynamically decreasing counterbalance moment which corresponds to the decreasing moment load on the support arm 24 as the support arm 24 moves downward from 90° horizontal to 180° vertical to provide a linear counterbalance force throughout the total adjustable range of the support arm 24.

Pivot tabs 162 and 164 extend at right angles from the planar members 104 and 106, respectively, to form a portion of angled bracket assemblies 20 and 18. At angled bracket assembly 20 a bolt 166 passes through a Belleville washer 168, through planar portion 100b of angled support bracket 100, through a UHMWPE washer 170, and through pivot tab 162, and secures into a threaded insert 172 secured to the inner wall of the pivot tab 162. Bolt 166 is adjusted to provide desirable frictional properties across the assembly. In a similar fashion, and at angled bracket assembly 18, a bolt 174 passes through a Belleville washer 176, through planar portion 98b of angled support bracket 98, through a UHMWPE washer 178, and pivot tab 164, and secures into a threaded insert 180 (directly below nut 146 in FIG. 4) secured to the inner wall of the pivot tab 164. Bolt 174 is adjusted to provide desirable frictional properties across the assembly. This friction stabilizes the entire assembly as it pivots about vertical axis 26 shown in FIG. 1. A semicircular slot 182 passes through the planar portion 100b of angled support bracket 100, UHMWPE washer 170, and pivot tab 162 for adjustability access to the slot 148 in the end of the threaded shaft 142. UHMWPE washer 170 is positioned and secured with respect to the angled support bracket 100 by means of mutually engaged interlock tabs (not illustrated) to prevent washer rotation and secure alignment of the semi-circular slot 182 common to the UHMWPE washer 170, pivot tab 162, and planar portion 100b of angled support bracket 100.

FIG. 4 illustrates a front view of the support arm 24 in the fully lowered position with attached three-axis pivot 30 and flat panel display 16. Illustrated in particular is a view of the three-axis pivot 30 and of the gas spring 25 secured between the gas spring mount 140 and the pivot pin 184, with plastic spacers 186 and 188, in the support arm 24.

FIG. 5 illustrates a front view of the pivotal support bracket 22 secured to the track plates 12 and 14.

FIG. 6 illustrates a bottom view in partial cross section of the pivotal support bracket 22 secured to the track plates 12 and 14.

MODE OF OPERATION

FIGS. 7–10 are side views in partial cutaway of the vertical surface mount 10 showing various positionings of the support arm 24 along its 180° pivot range 191 about horizontal axis 28 shown in FIG. 1. The three-axis pivot 30 and the flat panel display 16 are not illustrated for purposes of brevity and clarity. In these particular examples the gas spring mount 140 is adjusted to the maximum load position, thus providing the greatest offset from horizontal pivot axis 28, providing the greatest gas spring assistance. As adjustable gas spring mount 140 is adjusted closer to the horizontal axis 28, the counterbalance pivot point is lessened, which is desirable with smaller, lighter loads. Infinite adjustability within a range of payloads is desirable and attainable with this design. Also illustrated is the ability of the support arm 24 to travel from +90° (vertical up position) to −90° (vertical down position).

It should be noted that for each and every various monitor weight there is an optimum position for the gas spring mount 140. And, even further, it should be noted that at each adjustment point (weight of monitor), the support arm 24 will, by designs dynamically adjust the counterbalance moment as the support arm 24 is moved through the 180° range of travel.

The load moment increases as the support arm 24 travels from 0° to 90°, reaching its maximum at 90°. It then decreases as the support arm 24 is moved from 90° to 180°. The load moment is at its minimum (zero) when the support arm 24 is vertical, 0° or 180°.

The counterbalance moment increases and decreases essentially to cancel the load moment as the support arm 24 travels from 0° to 90° to 180°. The dynamic aspect of the counterbalance is created by the relationship of the three pivot points in the system. Point B is the pivot of the support arm 24 through the horizontal axis 28. Point A is the gas spring pivot bolt 160 on the pivotal support bracket 22. Point C is the gas spring pivot at pivot pin 184 away from the support arm 24 pivot at B. At 0° and 180° the three pivot points B, A and C are all in line, thus providing zero counterbalance moment. As the support arm 24 pivots about the pivot at B, the angle A-C-B increases to its maximum at 90° and then decreases back to zero at 180°. This dynamic angle exactly corresponds with the load moment. The angle created about these pivot points puts the gas spring 25 in the correct position to counterbalance the load moment for each position of the support arm 24.

Figure 11:
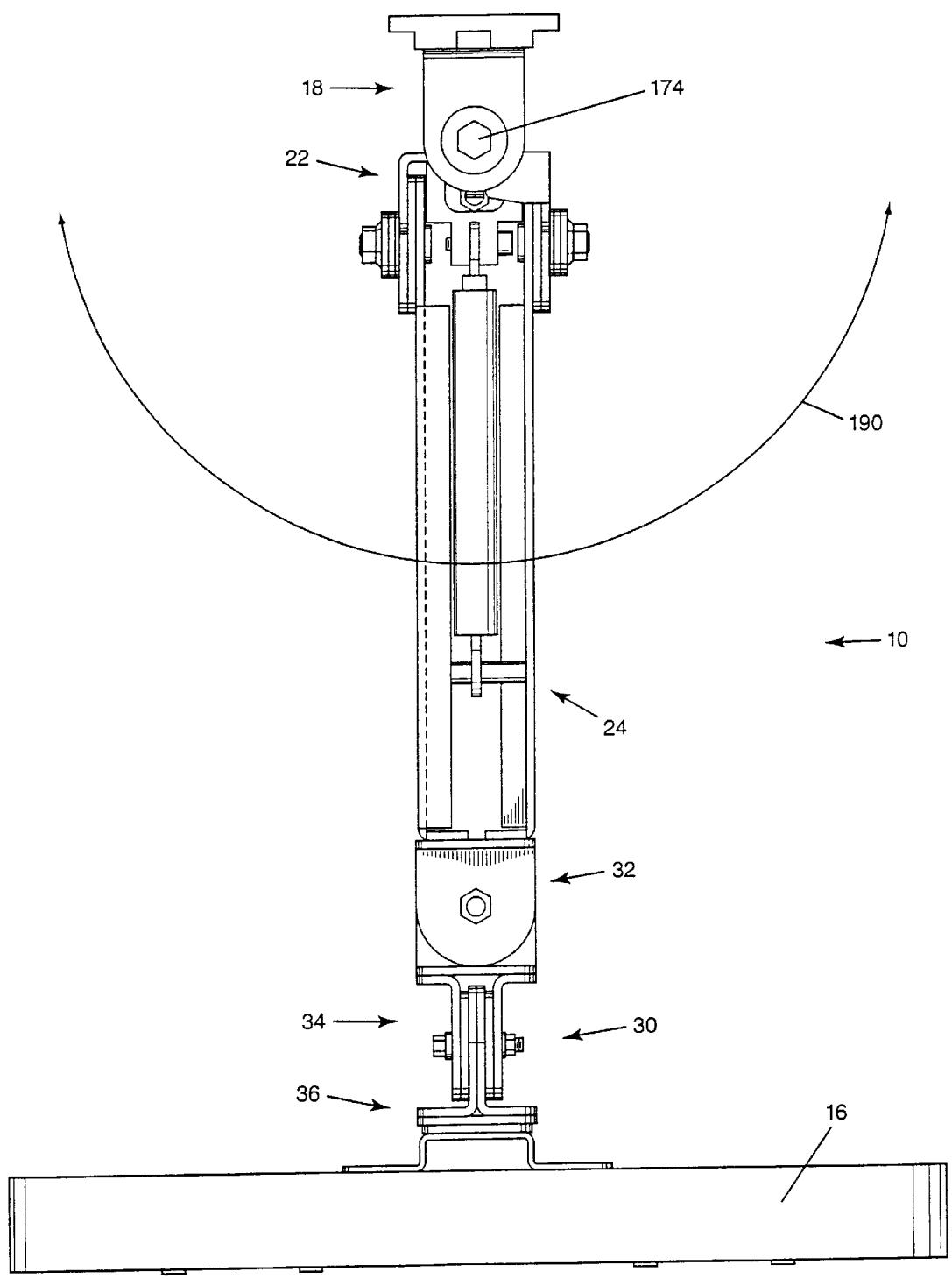
FIG. 11 illustrates a top view of the elements of FIG. 1 and the pivot arc along which the support arm is capable of moving about a vertical axis.

FIG. 11 illustrates a top view of the elements of FIG. 1 and the pivot arc 190 of the support arm 24 about vertical axis 26, as shown in FIG. 1, where bolt 174 secures angled bracket assembly 18 to the pivotal support bracket 22. The pivot arc 190 is capable of ±90° range, or greater, depending on the mounting configuration. The limit would normally be set by the width of the flat panel display 16 when it contacts the wall, plate, machine or other such surface, prior to the 90° pivot. Pivot assembly 32 allows the flat panel display 16 to be pivoted about vertical axis 40, shown in FIG. 2, allowing the flat panel display 16 to be positioned parallel to the wall, plate, machine or other such surface.

Figure 12:
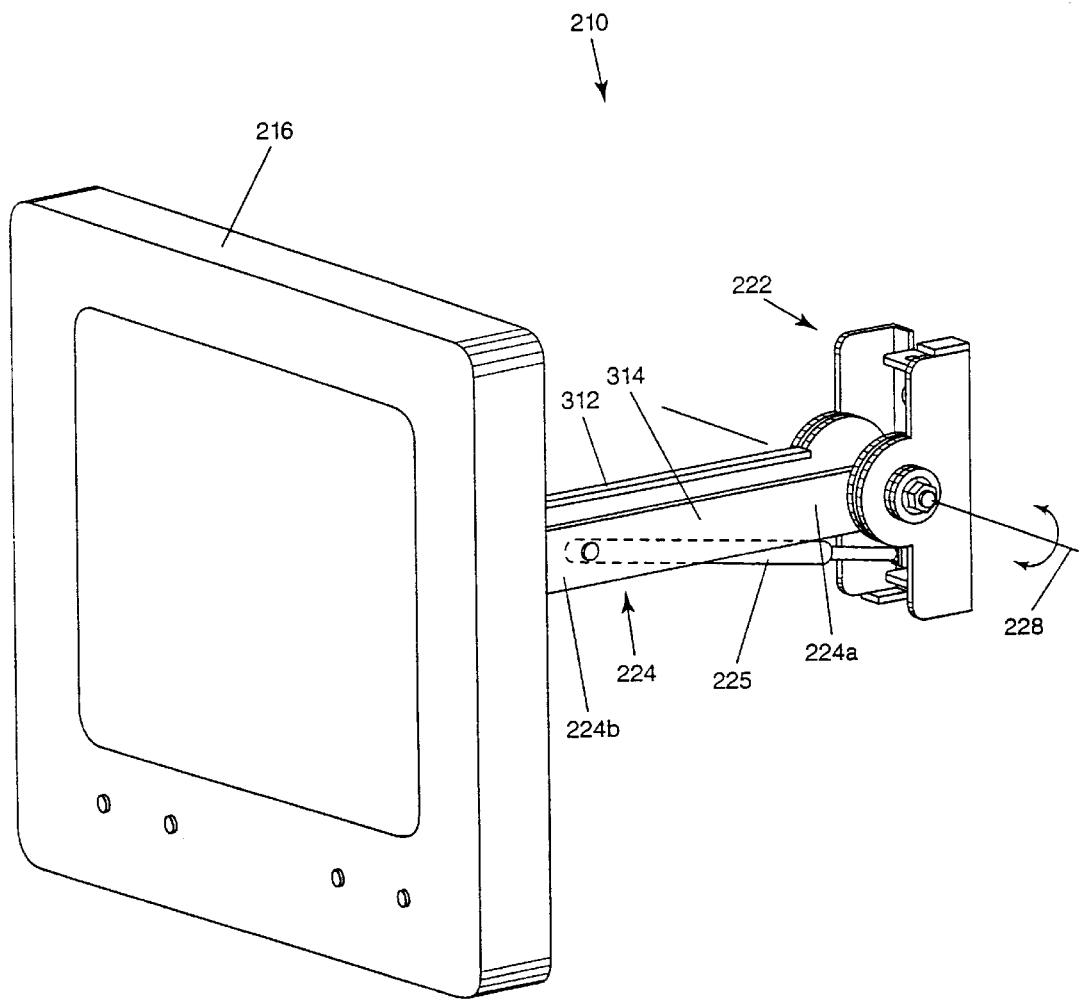
FIG. 12 illustrates a perspective view of a first alternative mounting system embodiment of the present invention in the form of another vertical surface mount for supporting a flat panel display, and also illustrates a flat panel display supported thereby.
Figure 13:
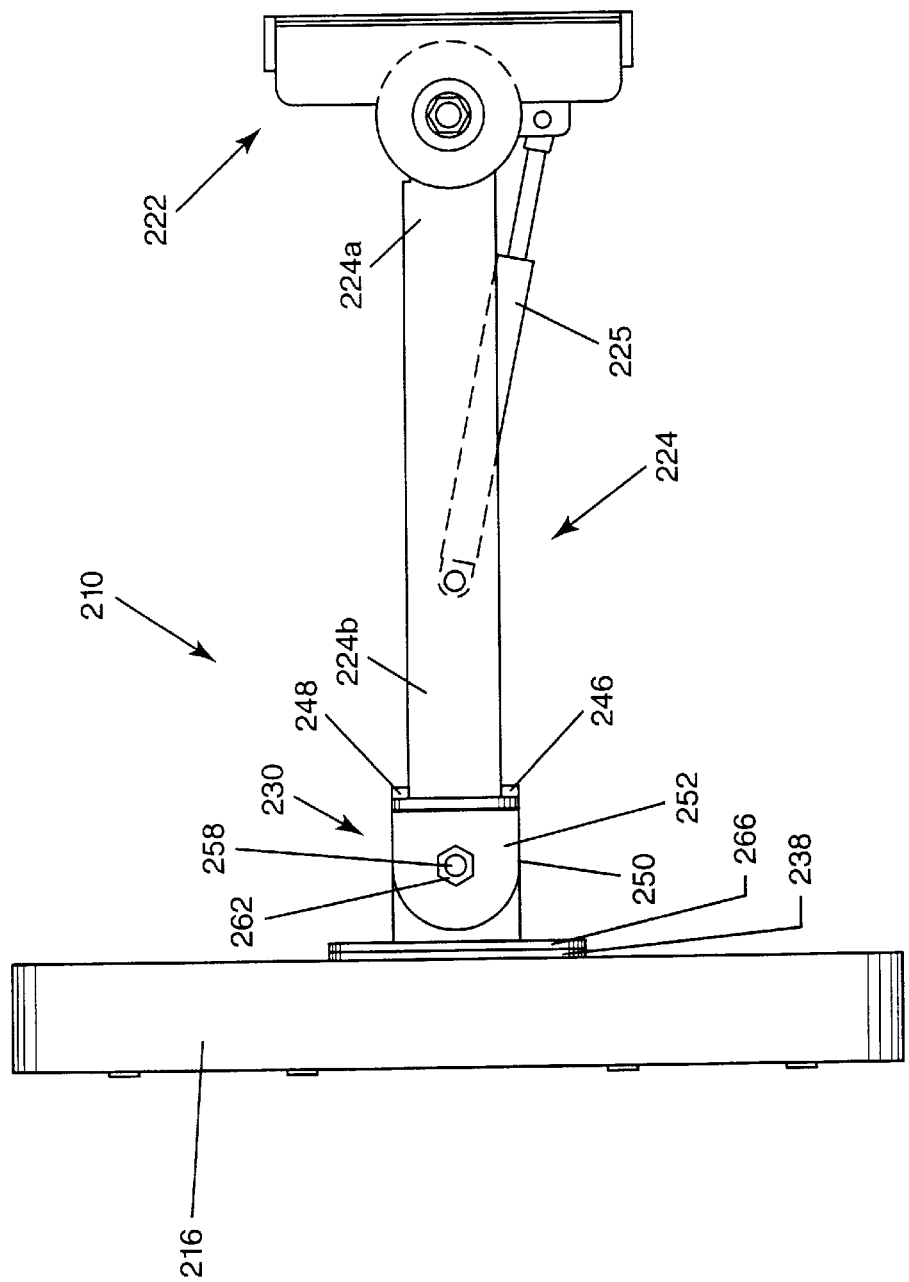
FIG. 13 illustrates a side view of the elements of FIG. 12.

FIG. 12 illustrates a perspective view of another vertical surface mount 210, the first alternative mounting system embodiment, supporting a flat panel display 216. Pivotal support bracket or arm elevation bracket 222 serves as a pivotal mount for support arm 224 and other associated components including a gas (e.g., nitrogen) spring 225. Gas spring 225 secures between the pivotal support bracket 222 and the support arm 224, as later described in detail. Support arm 224 pivotally secures to the pivotal support bracket 222 to offer movement of the support arm 224, the single-axis pivot 230, as shown in FIG. 13, and the flat panel display 216 as a unit about the horizontal axis 228. Alternately, the three-axis pivot 30, such as previously described in detail, can be secured at the outboard end 224b of the support arm 224 to support the flat panel display 216.

FIG. 13 illustrates a side view of the elements of FIG. 12. Illustrated in particular is the single-axis pivot 230 suitably secured between the outboard end 224b of support arm 224 and a component mount or bracket 238 on the rear surface of the flat panel display 216. The inboard end 224a of the support arm 224 is pivotally secured to the pivotal support bracket 222 to provide elevational pivotal positioning of the support arm 224 and its flat panel display 216 payload about the horizontal axis 228 illustrated in FIG. 12. The single-axis pivot 230 and the flat panel display 216 can be elevationally positioned about the horizontal axis 228 in conjunction with and by the action of the pivoted support arm 224. As viewed in FIG. 13, the single-axis pivot 230 offers tilt of the flat panel display 216 about the horizontal axis 240, as shown in FIG. 15, extending through the single-axis pivot 230.

The single-axis pivot 230 secures to vertically oriented flanges 246 and 248 extending from members of the support arm 224.

Figure 15:
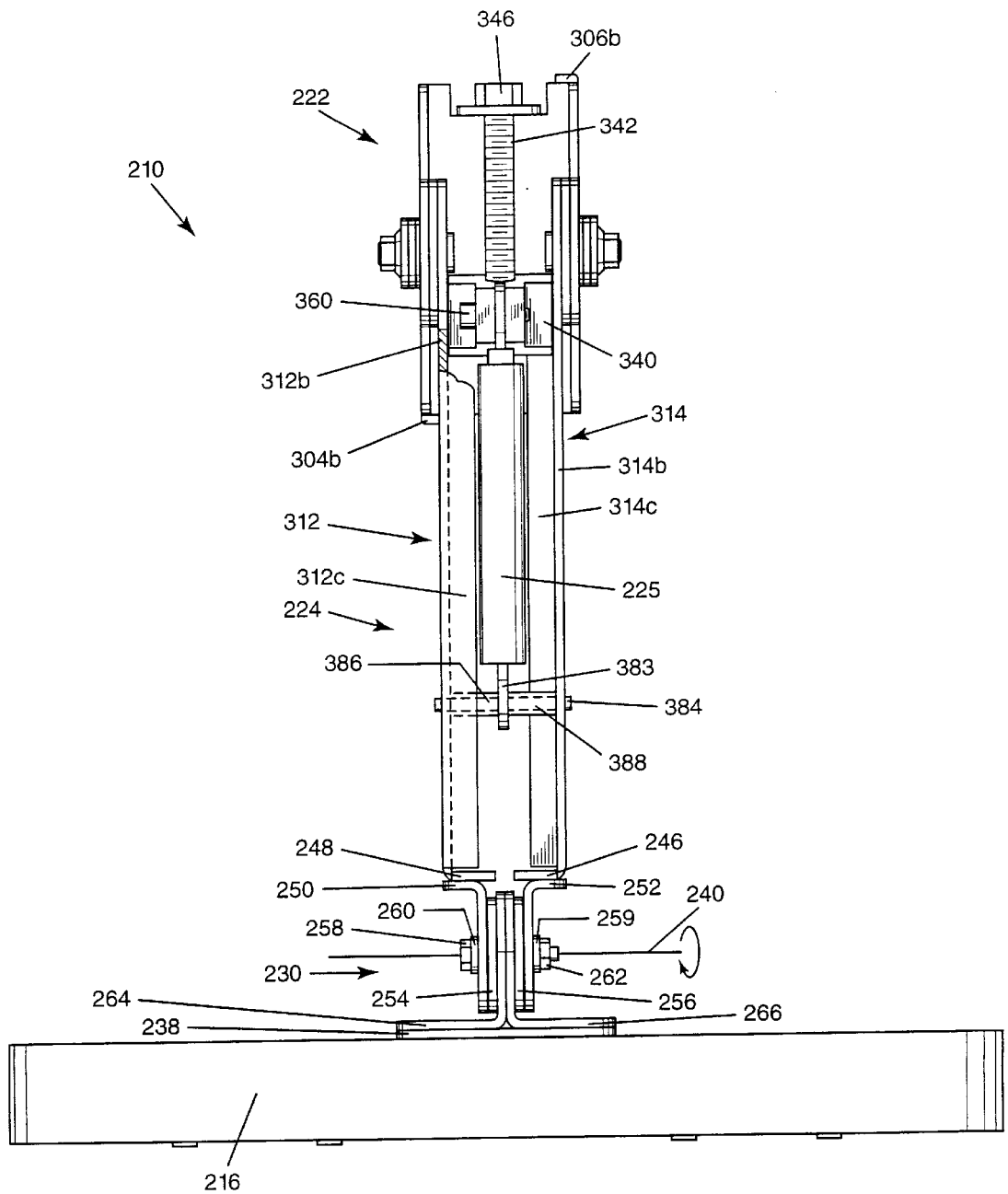
FIG. 15 illustrates a front view of the elements with the support arm of the vertical surface mount of FIG. 12 in the fully lowered position.

Now, with reference to FIGS. 13 and 15 the single-axis pivot 230 is further described. The single-axis pivot 230 includes angle brackets 250 and 252 secured to support arm flanges 246 and 248 at outboard end 224b of the support arm 224, UHMWPE disks 254 and 256 aligned to the inner planar surfaces of angle brackets 250 and 252, respectively, and a bolt 258 having two Belleville washers 259 and 260 and nut 262. Aligned to the interior surfaces of the UHMWPE disks 254 and 256 are the vertically aligned juxtaposed portions of angle brackets 264 and 266 which extend outwardly to present flanged portions for mating to bracket 238, which mounts the flat panel display 216 to the single-axis pivot 230. Bolt 258 extends through the angle brackets 250, 252, 264 and 266, UHMWPE disks 254 and 256, Belleville washers 259 and 260, and nut 262. Bolt 258 is tensioned across the assembly to provide suitable friction to support the flat panel display weight at all positions as the flat panel display 216 is tilted about horizontal axis 240, of FIG. 15, and moved vertically about horizontal axis 228, of FIG. 12, with support arm 224.

Figure 14:
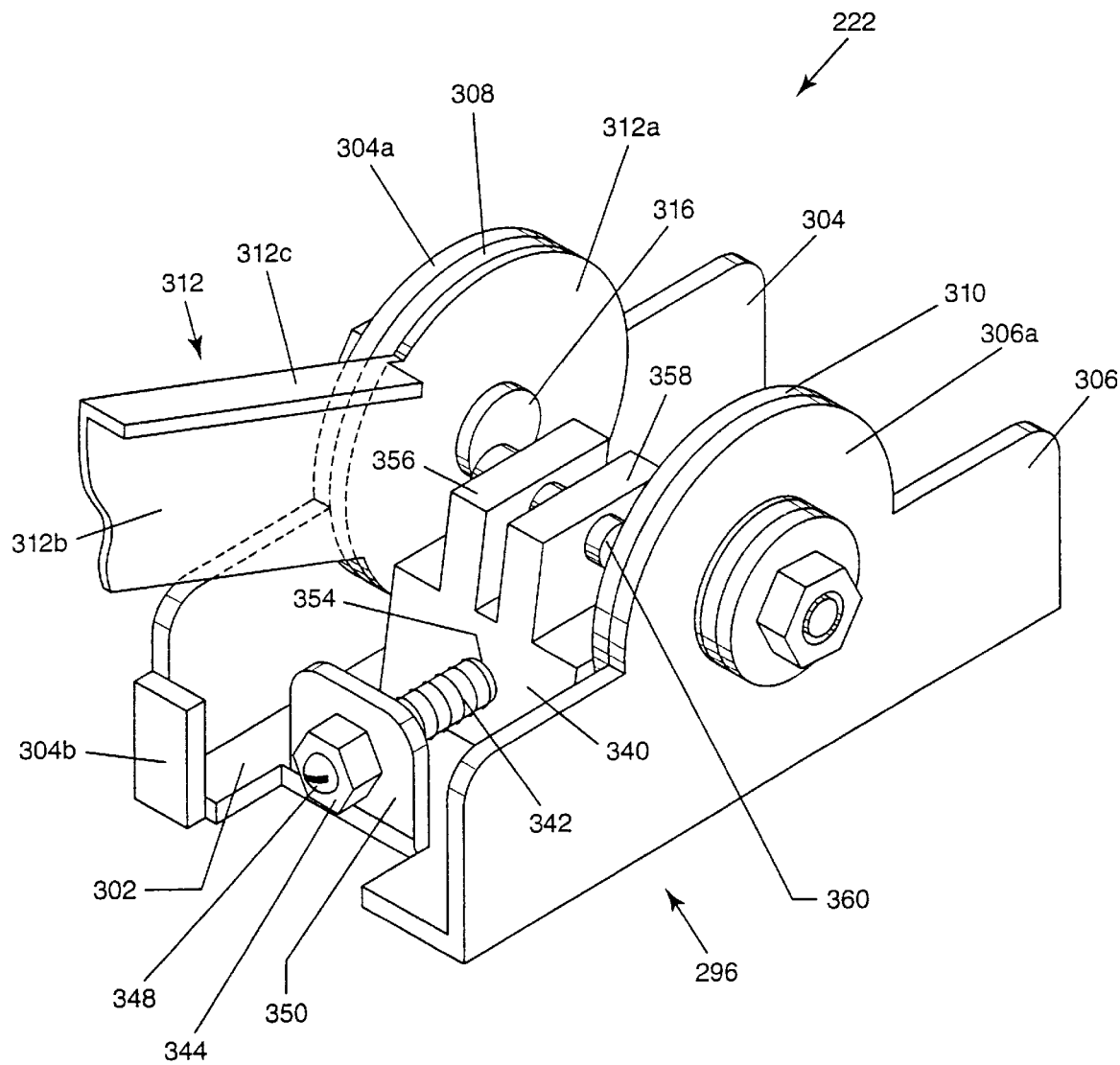
FIG. 14 illustrates a rotated isometric view of the pivotal support bracket of the vertical surface mount of FIG. 12.
Figure 16:
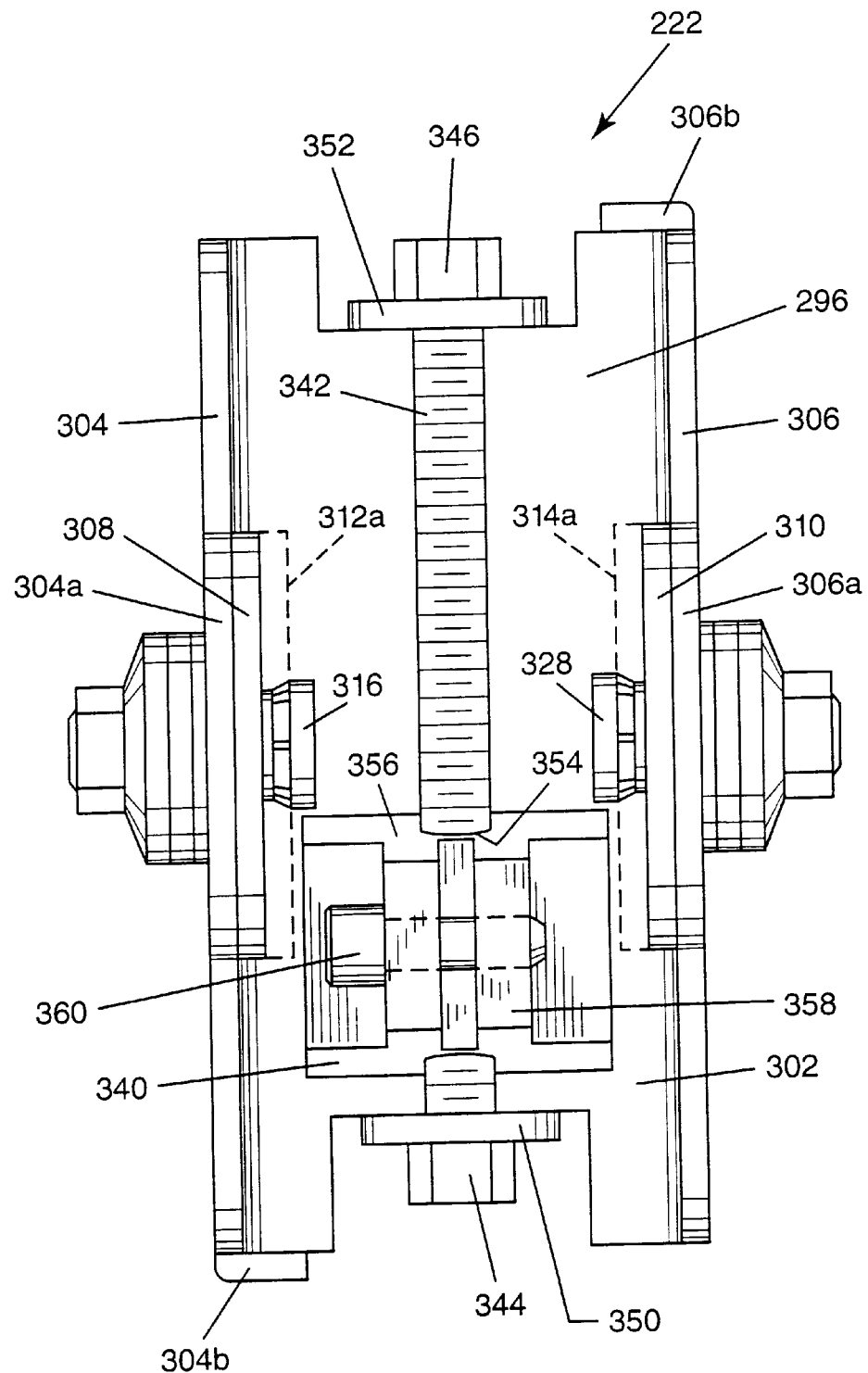
FIG. 16 illustrates a front view of the pivotal support bracket of FIG. 14.
Figure 17:
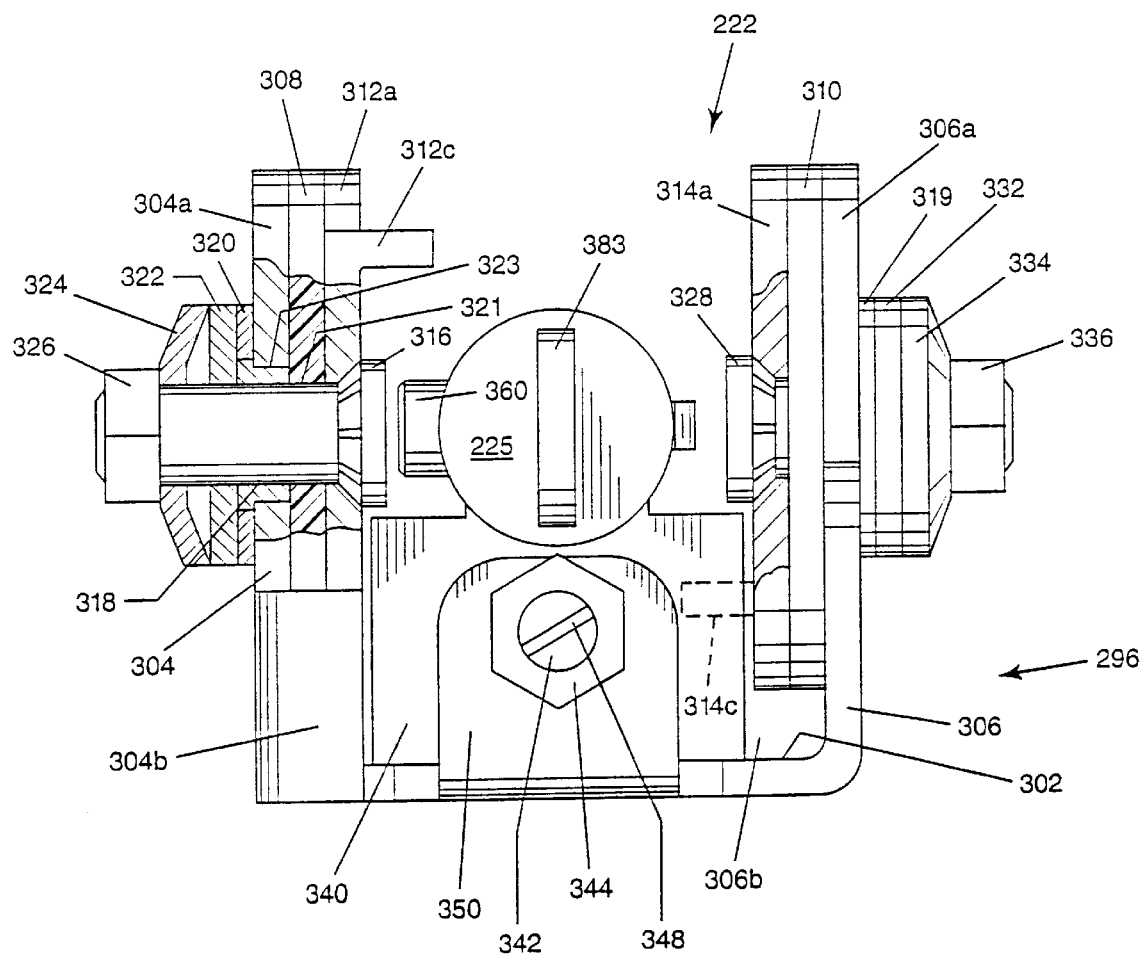
FIG. 17 illustrates a bottom view in partial cross section of the pivotal support bracket of FIG. 14.

FIG. 14 illustrates a rotated isometric view of the pivotal support bracket 222, FIG. 16 illustrates a front view of the pivotal support bracket 222, and FIG. 17 illustrates a bottom view in partial cross section of the pivotal support bracket 222. With reference to FIGS. 14, 16 and 17, the pivotal support bracket 222 is now described. The pivotal support bracket 222 includes a central bracket 296 having a central planar area 302 and planar members 304 and 306 extending at right angles therefrom. Extending further from the planar members 304 and 306 are contiguous semi-circular members 304a and 306a, respectively, which align to UHMWPE disks 308 and 310 in concert with planar members 304 and 306. Support arm 224, illustrated in FIG. 12, includes a left support arm member 312 and a right support arm member 314. Referring to FIG. 14, left support arm member 312 includes a disk-like portion 312a corresponding to the size of the UHMWPE disk 308. A planar member 312b having a flange 312c extends from the disk-like portion 312a to form part of the support arm 224. Right support arm member 314 is not shown in FIG. 14 for purposes of brevity and clarity. However, as can be seen from FIGS. 15 and 17, right support arm member 314 is similar to left support arm member 312 and includes a disk-like portion 314a corresponding to the size of the UHMWPE disk 310 and a planar member 314b having a flange 314c and extending from the disk-like portion 314a to form the other part of the support arm 224. Flanges 312c and 314c of FIG. 15 also act as stops on bracket tabs 304b and 306b, stopping the support arm 224 at a ±90° rotation. FIG. 16 illustrates disk-like portions 312a and 314a of left and right support arm members 312 and 314 in dashed lines. FIG. 17 illustrates the left and right support arm members 312 and 314 in the down position, but shows the full disk-like portion 312a (partially in cross section) and a cutaway view of the disk-like portion 314a for purposes of brevity and clarity. A captive stud 316 secures in the disk-like portion 312a of the left support arm member 312 and extends through an oilite bearing 318 and accompanying oilite washer 320 assembly centered about and along holes 321 and 323 in the UHMWPE disk 308 and the planar member 304, respectively, through a steel washer 322, a Belleville washer 324, and a nut 326. Nut 326 is adjusted to provide tension across the assembly to provide suitable friction to stabilize the left support arm member 312. In a similar fashion, a captive stud 328 secures in the disk-like portion 314a of the right support arm member 314 and extends through an oilite bearing (not shown, but similar to oilite bearing 318) and accompanying oilite washer 319 assembly centered about and along holes in the UHMWPE disk 310 and the planar member 306, through a steel washer 332, a Belleville washer 334, and a nut 336. Nut 326 is adjusted to provide tension across the assembly to provide suitable friction to stabilize the right support arm member 314.

A positionable and adjustable gas spring mount 340 is adjustably mounted to adjustably slide along the central planar area 302 as positioned by a threaded shaft 342 having nuts 344 and 346 affixed at opposing ends. A slot 348 at the lower end of the threaded shaft 342 provides for rotational adjustability of the threaded shaft 342 and thus the gas spring mount 340 along the central planar area 302. The angle of central planar area 302 and thus the angle of threaded adjustment shaft 342 in relation to the support arm 224 horizontal pivot axis 228, as shown in FIG. 12, is predetermined by a computerized mathematical algorithm for each mounting option or weight to provide a user adjustable counterbalance force pivot position throughout the support arm 224 operating range. See FIGS. 18, 19 and 23 for examples of threaded shafts 342, 424 and 642 set at different adjustment angles for each mounting option. It should be noted that positionable and adjustable gas spring mount 340 is positionable in the space between left support arm member 312 and right support arm member 314 up to and intersecting with the support arm 224 horizontal axis 228, as shown in FIG. 12, allowing the support arm 224 to rotate and counterbalance a variable payload in a range of 0° to 180°. Tabs 350 and 352 extend outwardly from the central planar area 302 to support the ends of the threaded shaft 342 by means of holes located in the tabs 350 and 352 through which the threaded shaft 342 passes. A threaded hole 354 central to the gas spring mount 340 accommodates the threaded shaft 342 for purposes of adjustment of the gas spring mount 340. Gas spring mount 340 also includes opposed tabs 356 and 358. A pivot bolt 360 passes through the opposed tabs 356 and 358 to serve as a mount for one end of the gas spring 225. The outboard end 383 of the gas spring 225 secures to a pivot pin 384 passing through left and right support arm members 312 and 314 and plastic spacers 386 and 388, as illustrated in FIG. 15.

The load counterbalance mechanism provides a dynamically increasing counterbalance moment which corresponds to the increasing moment load on the support arm 224 as the support arm 224 traverses from 0° vertical to 90° horizontal and provides a dynamically decreasing counterbalance moment which corresponds to the decreasing moment load on the support arm 224 as the support arm 224 moves downward from 90° horizontal to 180° vertical to provide a linear counterbalance force throughout the total adjustment range of the support arm 224.

FIG. 15 illustrates a front view of the elements of FIG. 12 with the support arm 224 in the fully lowered position with attached single-axis pivot 230 and flat panel display 216. Illustrated in particular is a view of the single-axis pivot 230 and of the gas spring 225 secured between the gas spring mount 340 and the pivot pin 384, with plastic spacers 386 and 388, in the support arm 224.

FIG. 16 illustrates a front view of the pivotal support bracket 222.

FIG. 17 illustrates a bottom view in partial cross section of the pivotal support bracket 222.

Figure 18:
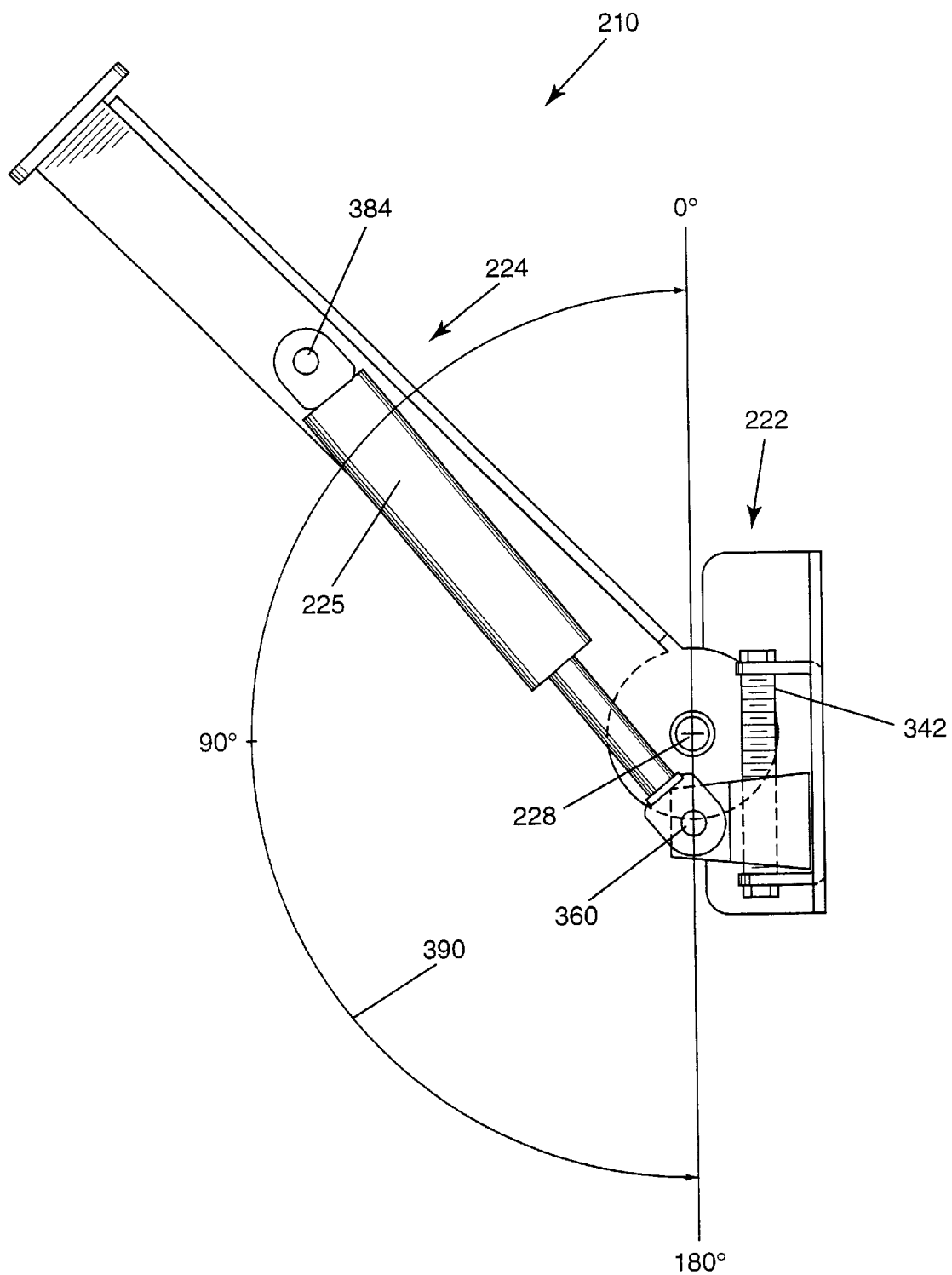
FIG. 18 illustrates a partial cutaway side view of the vertical surface mount of FIG. 12 with the support arm in one position of various possible positionings along its 180° pivot range about a horizontal axis.

FIG. 18 illustrates a partial cutaway side view of the vertical surface mount 210 with the support arm 224 in one position of various possible positionings along its 180° pivot range about horizontal axis 228 shown in FIG. 12. Arc 390 further illustrates the 180° range of motion of the pivot positionings. The single-axis pivot 230 and the flat panel display 216 are not illustrated for purposes of brevity and clarity.

Figure 19:
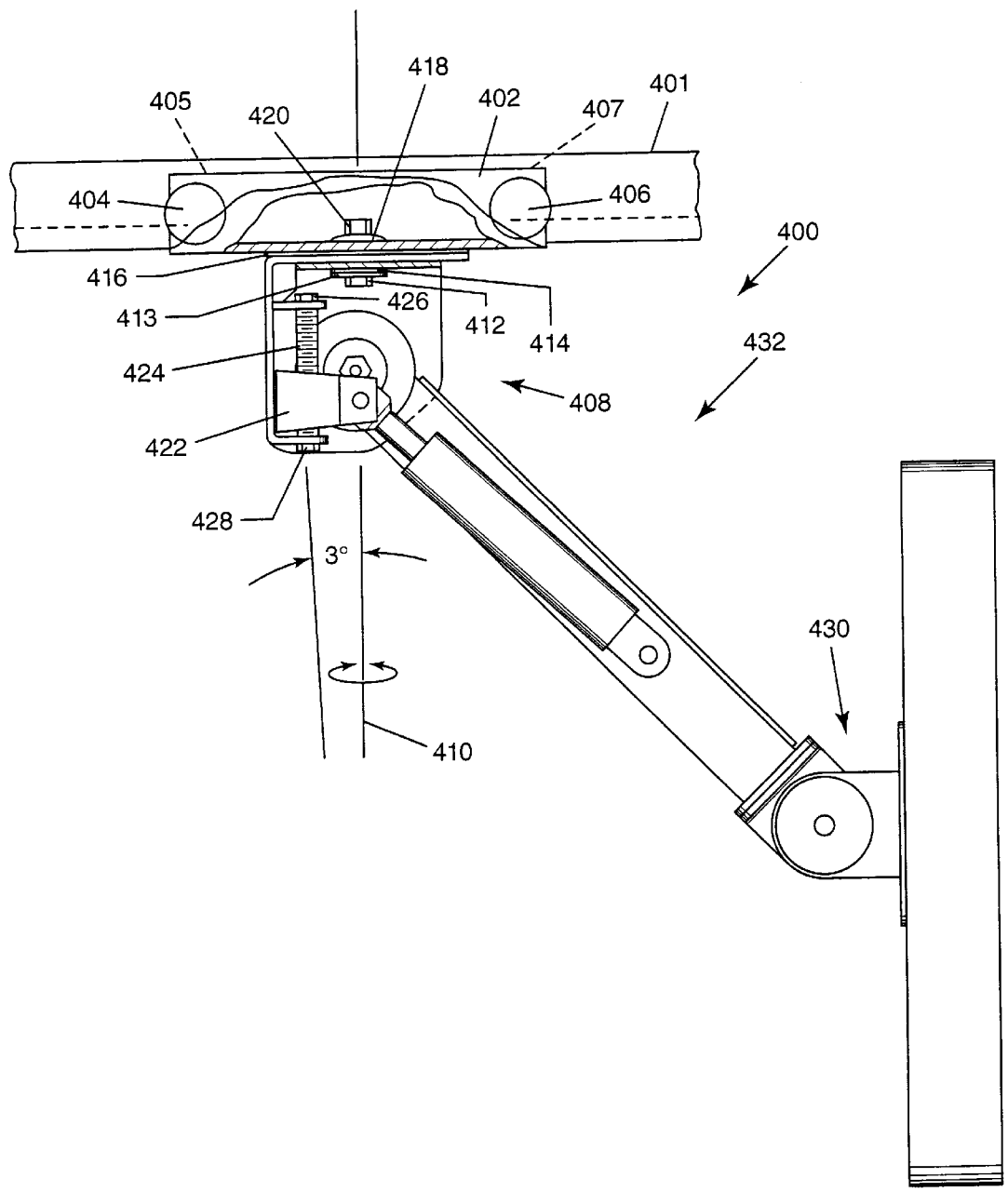
FIG. 19 illustrates in partial cutaway and partial cross section a side view of a second alternative mounting system embodiment of the present invention in the form of a horizontal surface or ceiling track mount for supporting a flat panel display, and also illustrates a flat panel display supported thereby.

FIG. 19 illustrates, in partial cutaway and partial cross section, a side view of a horizontal surface or ceiling track mount 400, the second alternate mounting system embodiment, supporting a flat panel display. The horizontal surface or ceiling track mount 400 is comprised of a support bracket 402 and four track wheels 404, 405, 406 and 407, a support arm 432, a single-axis pivot 430, and a pivotal support bracket or arm elevation bracket 408 constructed according to the same principles as pivotal support bracket 222 illustrated in FIG. 14. The support arm 432 and the single-axis pivot 430 are constructed identically to the support arm 224 and single-axis pivot 230, respectively, illustrated in FIG. 15. The pivotal support bracket 408 rotates around vertical axis 410 providing an infinitesimal number of azimuthal positionings. The horizontal surface or ceiling track mount 400 is designed according to the same principles taught in the vertical surface mount embodiments, having a pivotal support bracket 408, bolt 412, Belleville washers 413 and 418, steel washer 414, UHMWPE disk 416, nuts 420, 426 and 428, an adjustable gas spring mount 422, and threaded shaft 424. Threaded shaft 424 is at a 3° offset to the vertical axis 410.

Track wheels 404, 405, 406 and 407 are captured by a ceiling mounted track 401 which allows the horizontal surface or ceiling track mount 400 and supported flat panel display to be easily rolled to any location along the ceiling mounted track. In the alternative, eliminating the ceiling mounted track 401 provides the option of incorporation of a fixed, rotational overhead mount.

Figure 20:
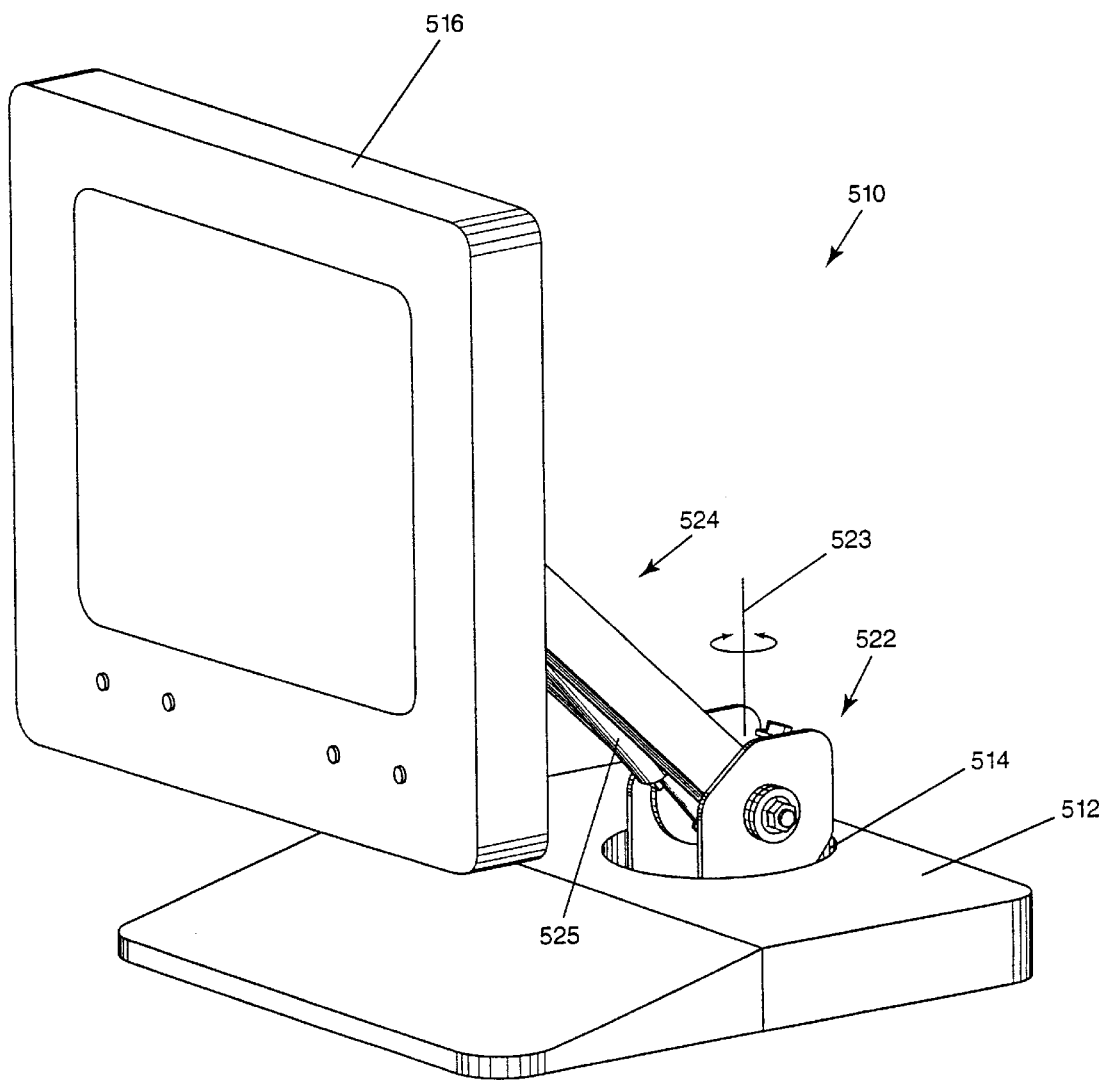
FIG. 20 illustrates a perspective view of a third alternative mounting system embodiment of the present invention in the form of a tabletop mount incorporating a gas spring for supporting a flat panel display, and also illustrates a flat panel display supported thereby.
Figure 21:
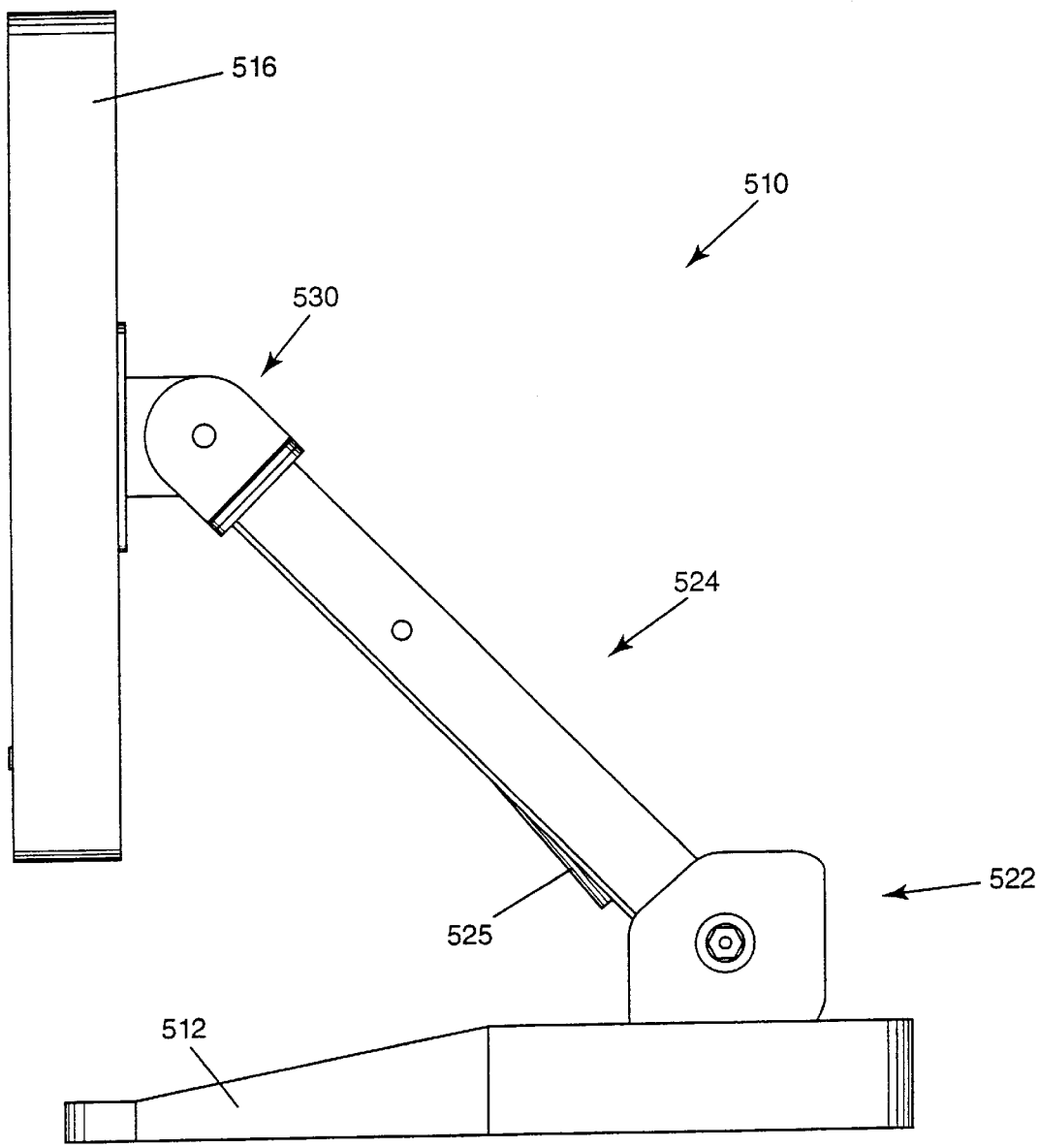
FIG. 21 illustrates a side view of the elements illustrated in FIG. 20.

FIGS. 20–21 illustrate two views of a tabletop (or desktop) mount 510, the third alternative mounting system embodiment of the present invention, supporting a flat panel display 516. The tabletop mount 510 is comprised of an angled base 512 with a recess 514, a pivotal support bracket or arm elevation bracket assembly 522, and a support arm 524 having a gas (e.g., nitrogen) spring 525. The pivotal support bracket assembly 522 is designed and constructed according to the same principles taught in the previous embodiments and rotates about vertical axis 523 providing azimuthal rotation of the support arm 524 and the flat panel display 516. A single-axis pivot 530 connects the support arm 524 to the flat panel display 516. The single-axis pivot 530 is designed and constructed according to the concept of the single-axis pivot 230 described in relation to FIG. 15.

Figure 22:
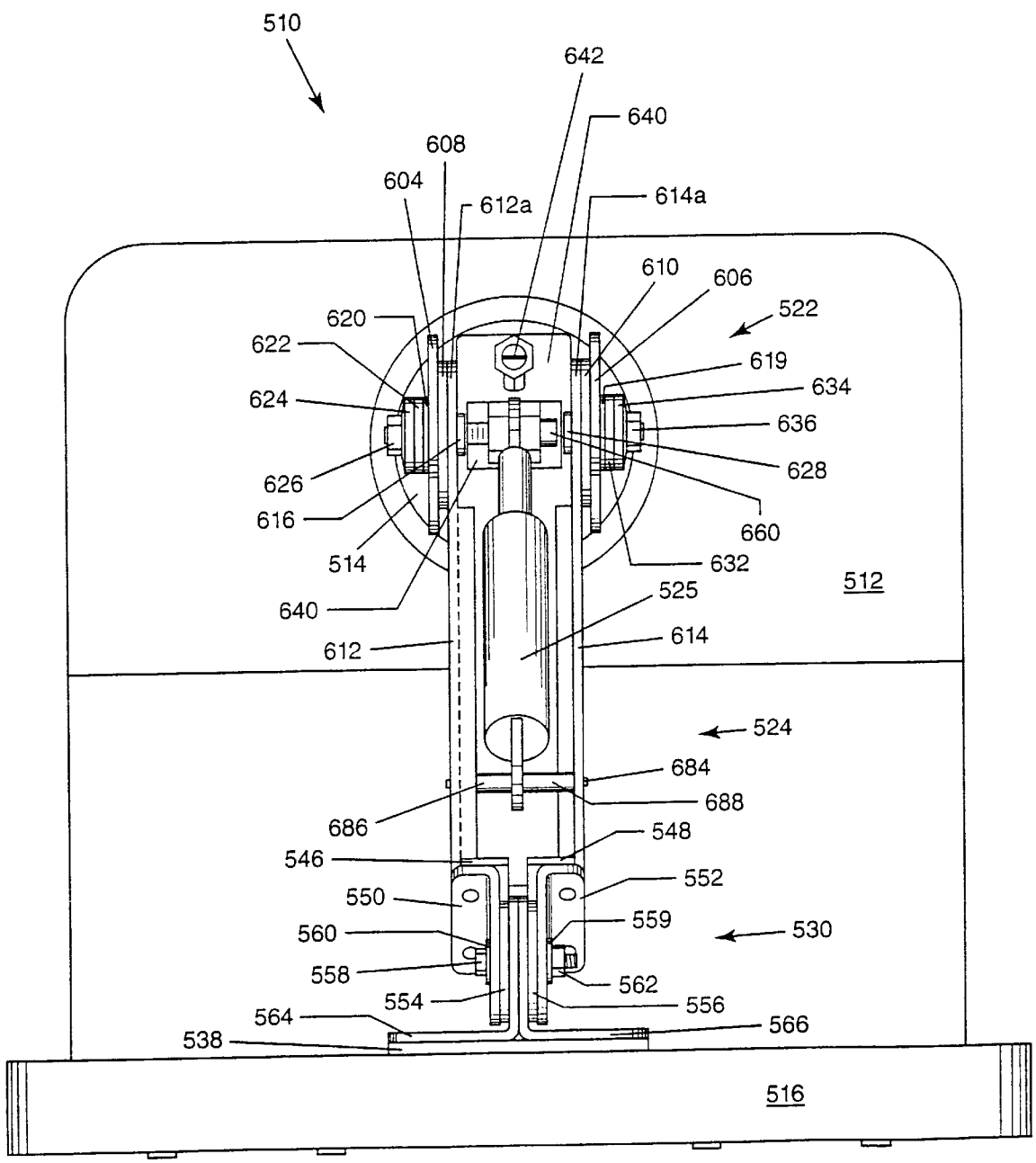
FIG. 22 illustrates a top view of the elements illustrated in FIG. 20.

FIG. 22 illustrates a top view of the tabletop mount 510. Specifically, the pivotal support bracket assembly 522, the support arm 524, and the single-axis pivot 530 will now be described in detail.

The pivotal support bracket assembly 522, designed and constructed using the same principles taught in the previous embodiments, is comprised of nuts 626 and 636, Belleville washers 624 and 634, steel washers 622 and 632, oilite washers 619 and 620, bracket planar members 604 and 606, UHMWPE disks 608 and 610, left and right support arm members 612 and 614, respectively, with disk-like portions 612a and 614a, respectively, captive studs 616 and 628, an adjustable gas spring mount 640 movable along a threaded shaft 642, and a pivot bolt 660.

The support arm 524 is comprised of a left support arm member 612, designed and constructed using the same principles taught in the previous embodiments, a right support arm member 614, a gas spring 525, plastic spacers 686 and 688, a pivot pin 684, and flanges 546 and 548.

The single-axis pivot 530, designed and constructed using the same principles taught in the first alternative embodiment, is comprised of angle brackets 550, 552, 564 and 566, UHMWPE disks 554 and 556, Belleville washers 559 and 560, component mount or bracket 538, and bolt 558 and nut 562.

Figure 23:
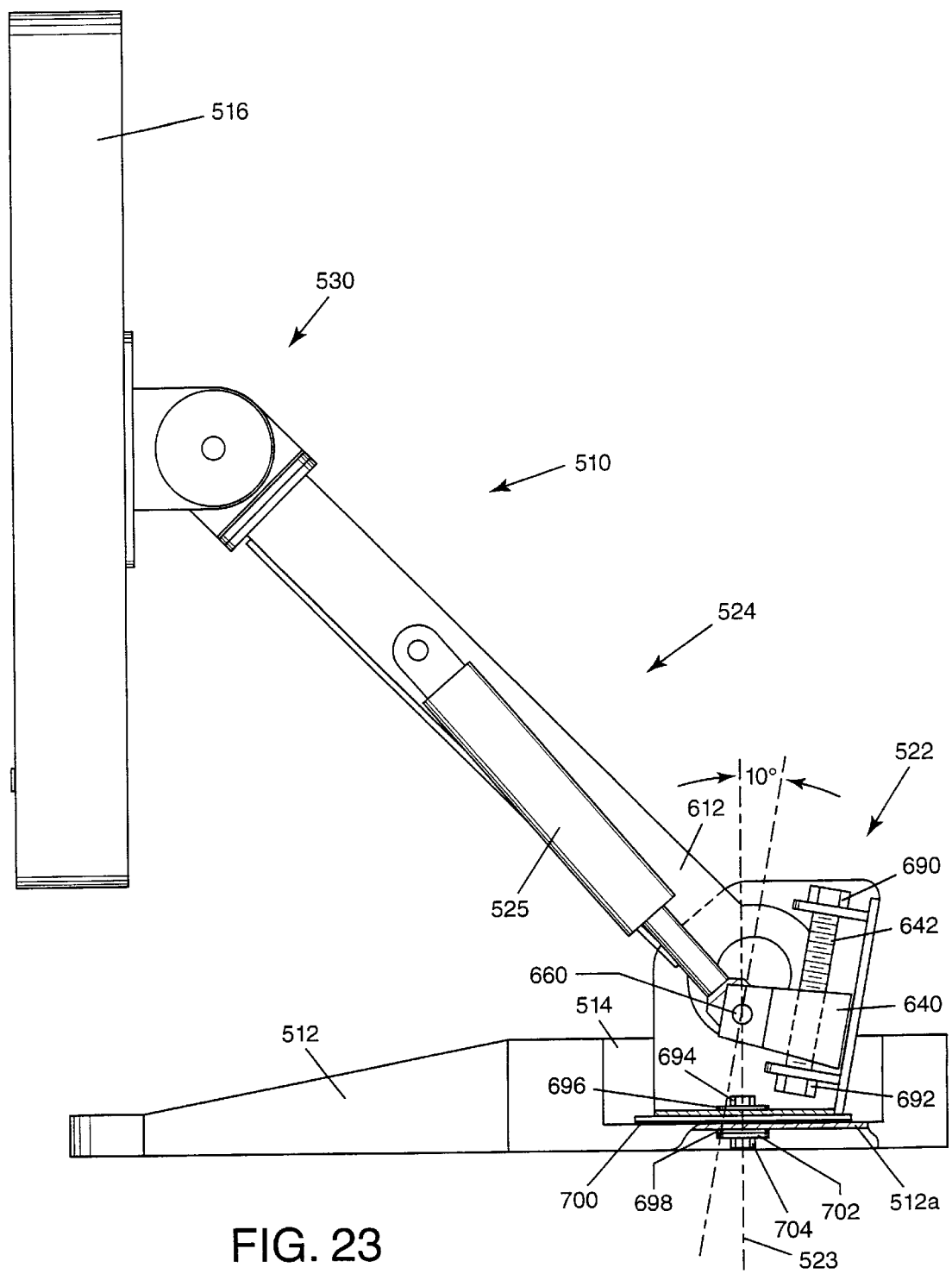
FIG. 23 illustrates in partial cross section and partial cutaway a side view of the elements illustrated in FIG. 20.

FIG. 23 illustrates in partial cross section and in partial cutaway a side view of the third alternative mounting system embodiment. The pivotal support bracket assembly 522, which rotates about its vertical axis 523, is now described in detail, specifically the mounting of the pivotal support bracket assembly 522 to the angled base 512. The pivotal support bracket assembly 522 is secured to angled base 512 in the recess 514 where bolt 694 passes downwardly through Belleville washer 696, pivotal support bracket assembly 522, UHMWPE disk 700, planar member 512a of angled base 512, steel washer 698, and Belleville washer 702, and is frictionally secured via nut 704. Removal of the angled base 512 allows the pivotal support bracket assembly 522 to be mounted in a pivotal application to a table, desk or countertop, or other mounting surface. Threaded shaft 642, secured by nuts 690 and 692, is offset 10° to the vertical axis 523.

Figure 24:
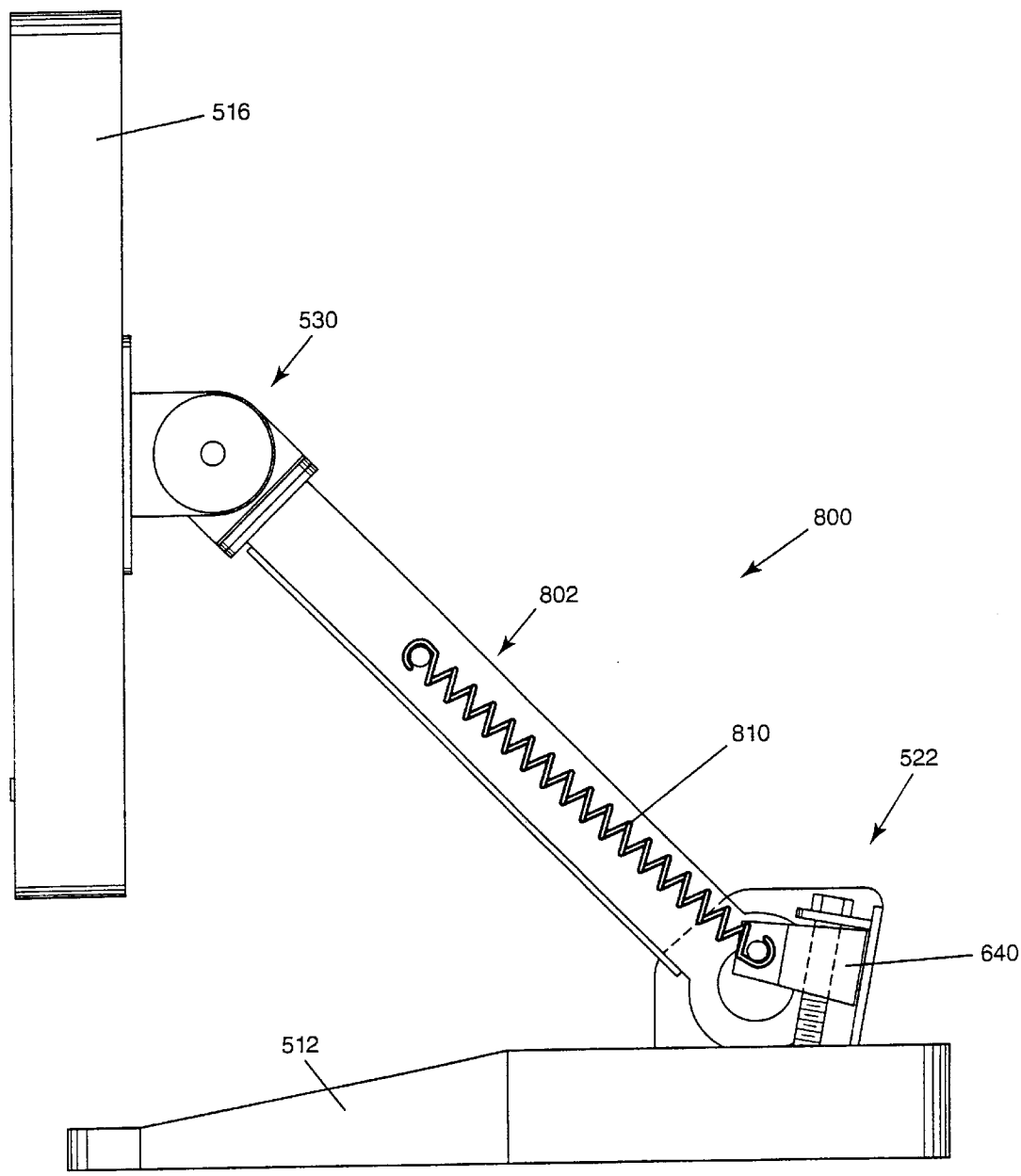
FIG. 24 illustrates in partial cutaway a side view of a fourth alternative mounting system embodiment of the present invention in the form of a tabletop mount incorporating a steel coil spring for supporting a flat panel display, and also illustrates a flat panel display supported thereby.

FIG. 24, a fourth alternative mounting system embodiment, illustrates in partial cutaway a side view of a tabletop (or desktop) mount 800 similar in construction and concept to the tabletop mount illustrated in FIGS. 20–23 and incorporating a support arm 802 having a steel coil spring 810. The tabletop mount 800, with a steel coil spring 810, is designed and constructed using the same principles taught in the previous embodiments, with the substitution of a steel coil spring 810 for the gas spring 525, and provides a pulling counterbalance force in lieu of the lifting force provided by gas spring 525, shown in FIG. 23. Since the steel coil spring is providing a pulling force, the positionable and adjustable gas spring mount 640 is mounted above the support arm horizontal pivot axis, such as axis 28 as shown in FIG. 1, instead of below. The support arm 802 with a steel coil spring 810 is mounted to angled base 512 in the same fashion using the same hardware as shown and described in FIG. 23.

Figure 25:
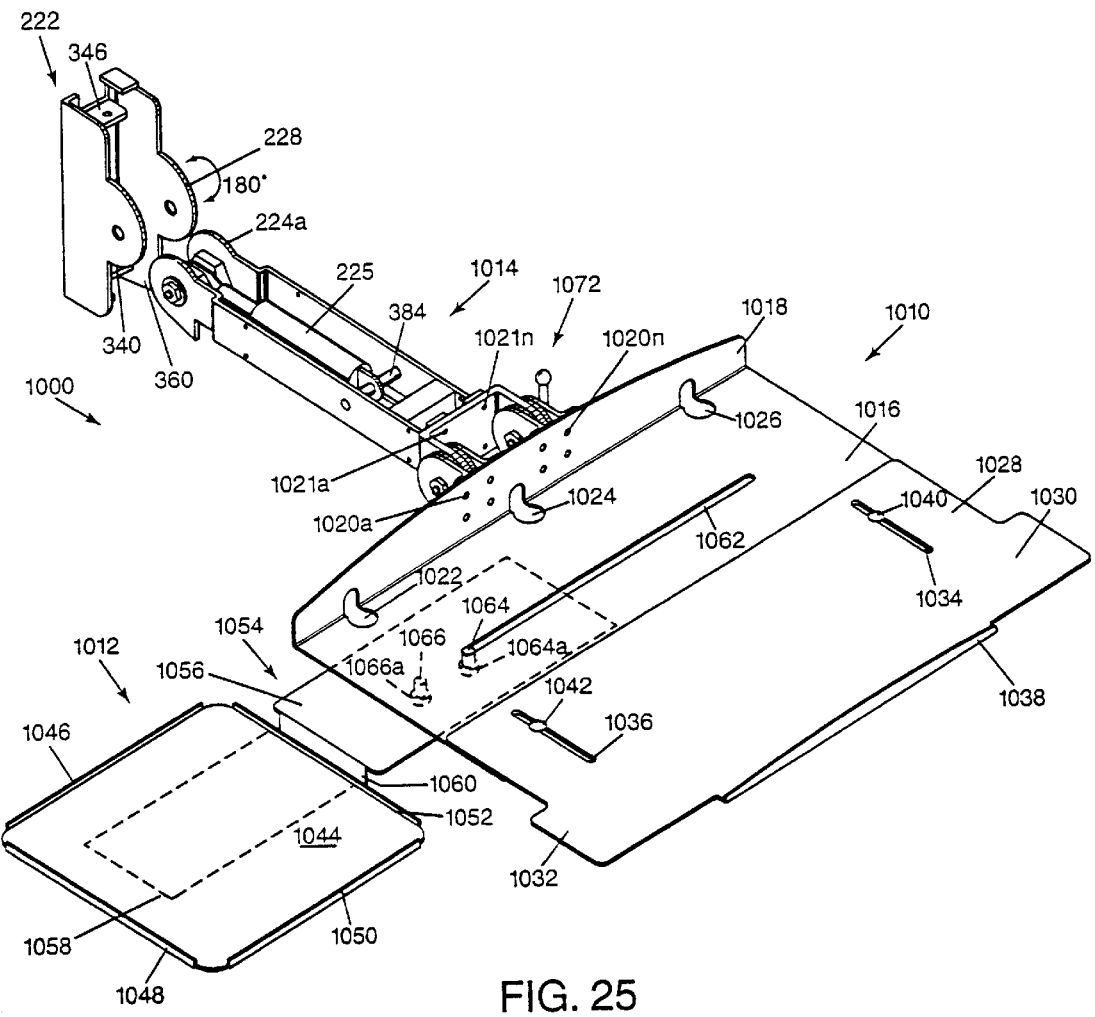
FIG. 25 illustrates a perspective view of a fifth alternative mounting system embodiment of the present invention in the form of a keyboard support system for supporting a keyboard.

FIG. 25 illustrates a perspective view of a keyboard support system 1000, the fifth alternative mounting system embodiment. The keyboard support system 1000 consists of a keyboard tray 1010, a mouse pad tray 1012, a pivot/brake assembly 1072 and a support arm 1014. The keyboard tray 1010 includes a fixed portion 1016 with mounting lip 1018 which extends perpendicular to the fixed portion 1016. Cable access holes 1022, 1024 and 1026 are located at the junction of the fixed portion 1016 and the mounting lip 1018. The mounting lip 1018 also has a plurality of mounting holes 1020a–1020n for securing the keyboard tray 1010 to the pivot/brake assembly 1072 and connected support arm 1014. Support arm 1014 is designed and constructed similarly to support arm 224 of FIG. 15. The pivot/brake assembly 1072 attaches to support arm 1014 with a plurality of screw and nut combinations 1021a–1021n. The keyboard tray 1010 also includes a slide plate 1028 having a right extended member 1030, a left extended member 1032, slots 1034 and 1036, machine screws 1040 and 1042, and a front lip 1038. The right and left extended members 1030 and 1032 accommodate various lengths of keyboard wrist rests. The slide plate 1028 slidingly secures to the fixed portion 1016 via slots 1034 and 1036 where machine screws 1040 and 1042 frictionally secure mutually thereto. Mounting lip 1018 and front lip 1038, when properly adjusted, capture and secure the keyboard and keyboard wrist rest to the keyboard tray 1010.

The mouse pad tray 1012, consists of a contiguous slide plate 1054 having an upper planar member 1056 and a lower planar member 1058, which are vertically offset and joined by an intermediate portion 1060. Mouse pad tray 1012, having a planar surface 1044 and lips 1046, 1048, 1050 and 1052, secures to the lower planar member 1058 of the contiguous slide plate 1054 via hook and loop material, double-sided tape or like materials. The upper planar member 1056 slidingly engages slide channels 1068 and 1070, shown in FIG. 28, where a machine screw 1064, having a knob 1064a, extends through a threaded hole in contiguous slide plate 1054 and upward into slot 1062. Machine screw 1066, having a knob 1066a, extends through a threaded hole in the contiguous slide plate 1054 to lock or stop all movement of the mouse pad tray 1012. Machine screw 1064 is a stop to limit lateral travel of the mouse pad tray 1012. The machine screw 1064 can be loosened by the knob 1064a to back the machine screw 1064 out of slot 1062 to allow the mouse pad tray 1012 to be removed and reinserted on the other side of the keyboard tray fixed portion 1016.

Figure 26:
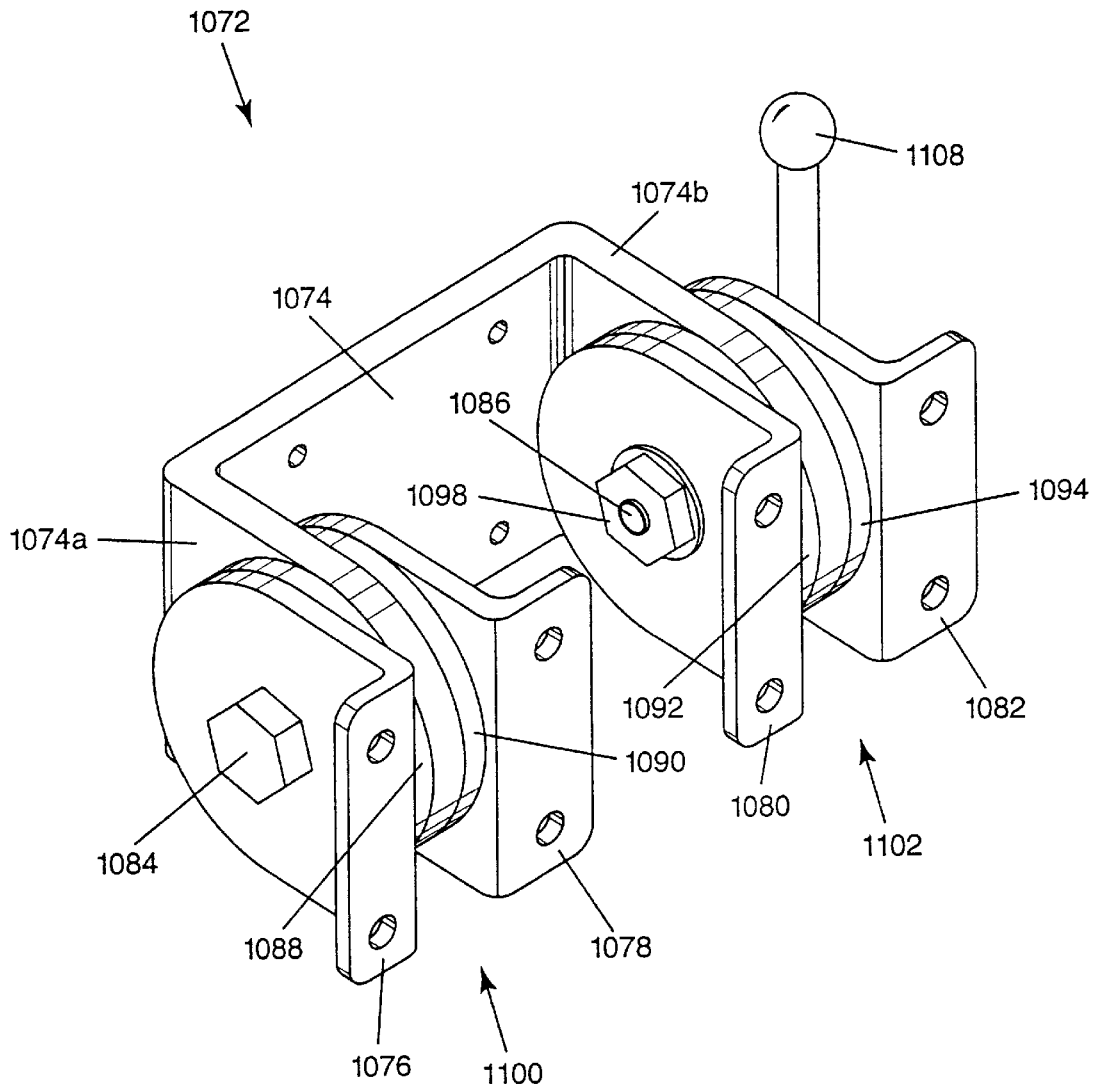
FIG. 26 illustrates a perspective view of the keyboard tray pivot/brake assembly of the keyboard support system of FIG. 25.

FIG. 26 illustrates a perspective view of the pivot/brake assembly 1072. Support arm 1014 is not shown for purposes of brevity and clarity. The pivot/brake assembly 1072 includes a U-shaped bracket 1074 with a left member 1074a and a right member 1074b which support friction assembly 1100 and brake assembly 1102, respectively.

Figure 27:
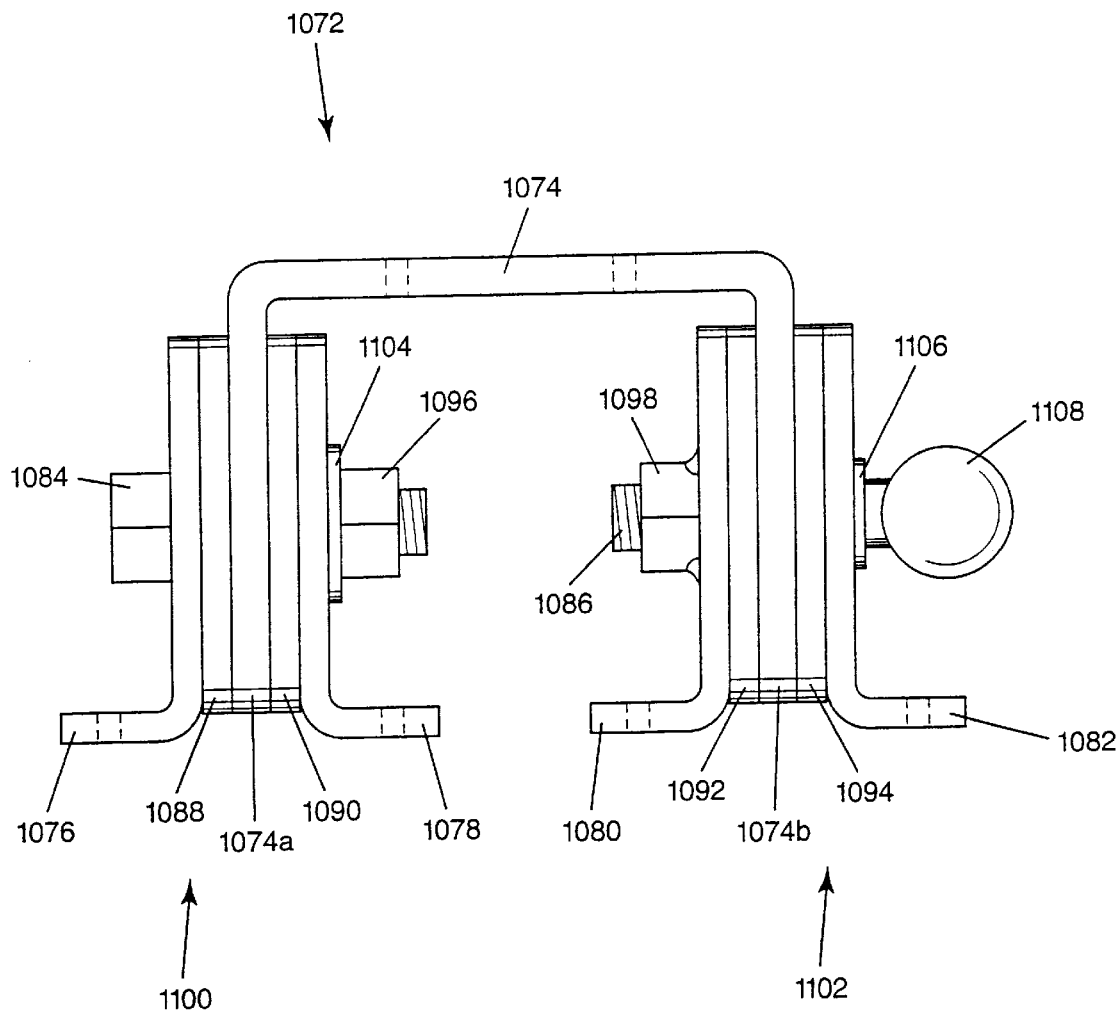
FIG. 27 illustrates a top view of the keyboard tray pivot/brake assembly illustrated in FIG. 26.

The friction assembly 1100 is now described. Bolt 1084 extends through angled bracket 1076, UHMWPE disk 1088, the left member 1074a of U-shaped bracket 1074, UHMWPE disk 1090, angled bracket 1078, and Belleville washer 1104, all of which are collectively frictionally secured via nut 1096, as shown in FIG. 27. A predetermined frictional force is thus established to ensure that the tilting motion of keyboard tray 1010, shown in FIG. 25, remains in any position selected by the user. If the user wishes to reposition the tilt of the keyboard tray 1010, the keyboard tray 1010 must be manually repositioned to overcome the keyboard tray 1010 tilting friction established above. Once the keyboard tray 1010 is moved to a different selected position, the unique friction devices will resistably restrain the keyboard tray 1010 in its new position as selected. Sufficient friction to maintain position of the keyboard tray 1010 during preparation for use is provided, but easy "breakaway" release to reposition the keyboard tray 1010 to a new operating position or to a storage position is afforded. The keyboard tray 1010 is locked into any position to provide increased stability using brake assembly 1102, which will be described in detail later, before the keyboard tray 1010 is used for mouse or keyboard input.

The unique characteristics of the UHMWPE disks 1088 and 1090 in combination with a spring force supplied by Belleville washer 1104 allow smooth adjustment of the keyboard tray and yet provide a constant frictional memory for the preset position of the keyboard tray. A predetermined poise is required of the operator to move the keyboard tray, at which time it remains in the new position.

The brake assembly 1102 is now described. Brake assembly 1102 has a brake handle 1108 having a threaded shaft 1086 which extends from the lower portion of the brake handle 1108 at a 90° angle, and extends through washer 1106, shown in FIG. 27, angled bracket 1082, steel washer 1094, the right member 1074b of U-shaped bracket 1074, steel washer 1092, and angled bracket 1080, all of which are collectively frictionally secured via nut 1098, which is welded to angled bracket 1080. Rotating brake handle 1108 will cause threaded shaft 1086 to turn in either direction, either lessening the frictional tension, allowing for a new tilt position to be selected, or increasing the frictional tension, which will act as a brake mechanism, locking the keyboard tray 1010 into position.

FIG. 27 illustrates a top view of the pivot/brake assembly 1072.

Figure 28:
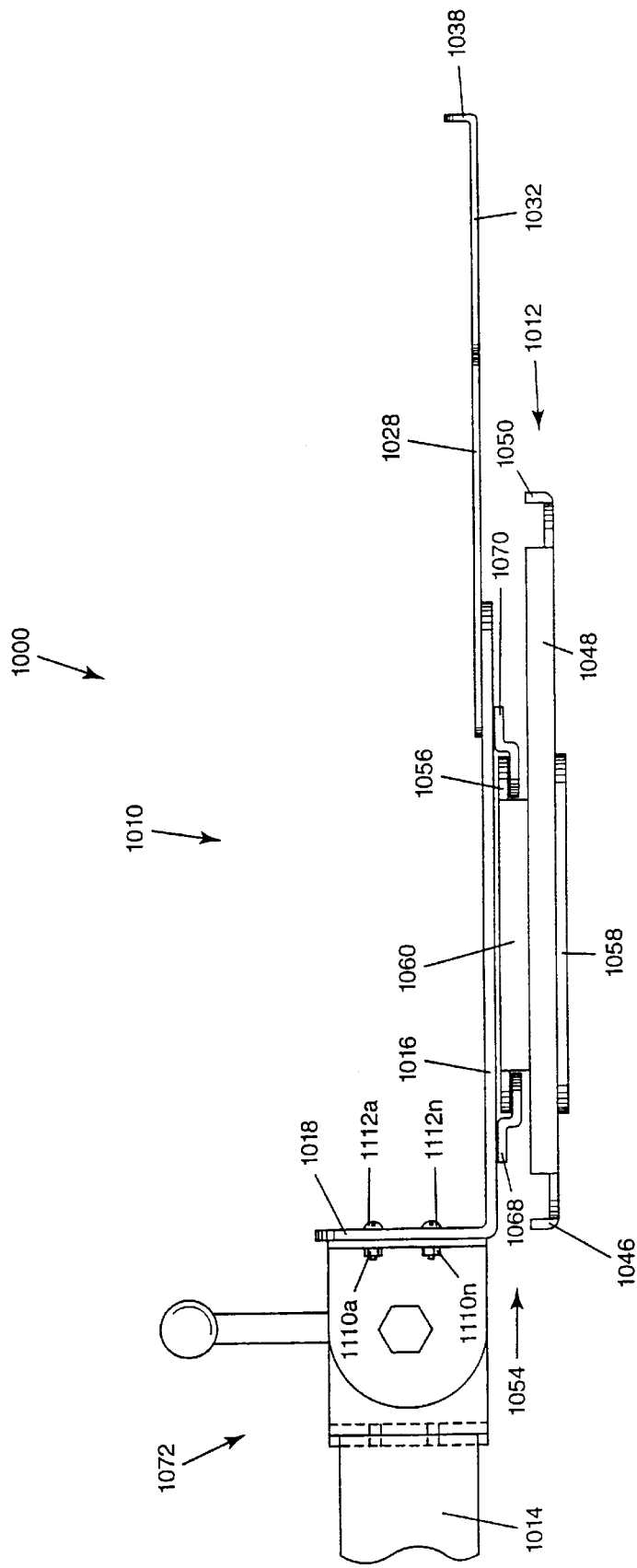
FIG. 28 illustrates a side view of the keyboard support system of FIG. 25.

FIG. 28 illustrates a side view of the keyboard support system 1000. Illustrated in particular are the slide channels 1068 and 1070 where the contiguous slide plate 1054 of the mouse pad tray 1012 slidingly engages the keyboard tray 1010. The upper planar member 1056 of the mouse pad tray 1012 is captured by the slide channels 1068 and 1070.

Also illustrated in FIG. 28 is a plurality of mounting bolts 1112a–1112n and nuts 1110a–1110n which secure the mounting lip 1018 of the keyboard tray 1010 to the pivot/brake assembly 1072.

Figure 29:
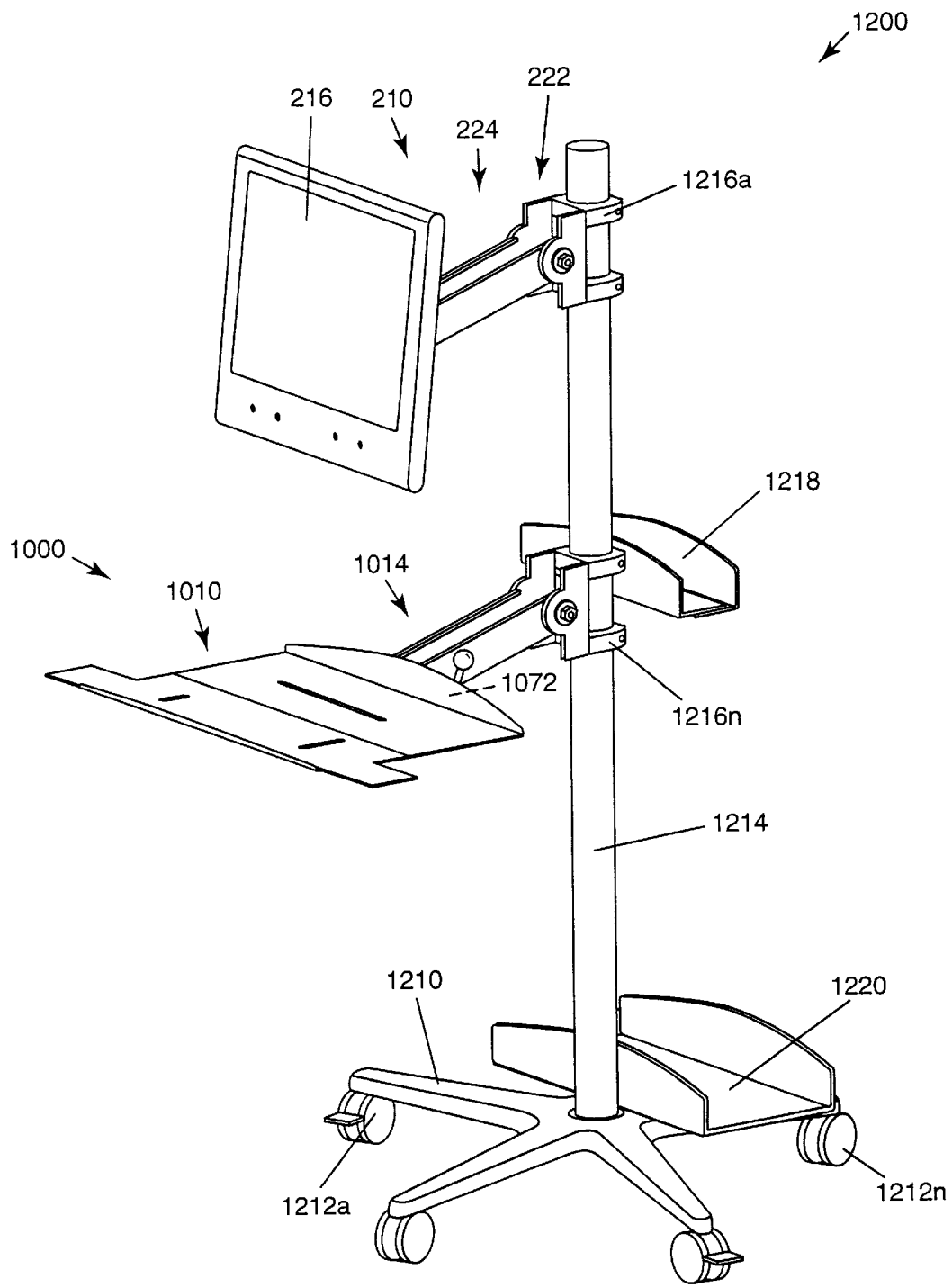
FIG. 29 illustrates a perspective view of a sixth alternative mounting system embodiment of the present invention in the form of a rolling cart assembly which incorporates a vertical surface mount for supporting a flat panel display, a keyboard support system for supporting a keyboard, and various mounting brackets for supporting other equipment, and also illustrates a flat panel display supported by the vertical surface mount.

FIG. 29 illustrates a perspective view of a sixth alternative mounting system embodiment in the form of a rolling cart assembly 1200. The rolling cart assembly 1200 includes a base 1210 with a plurality of dual wheel casters 1212a–1212n which supports a mounting pole 1214. Secured to the mounting pole 1214, via a plurality of pole mounting brackets 1216a–1216n, are the pivotal support bracket 222 and the support arm 224 of a vertical surface mount 210 which supports flat panel display 216, and the support arm 1014 in connection with pivot/brake assembly 1072 of a keyboard support system 1000. Also supported by the mounting pole 1214 is a CPU mounting bracket 1218. A mail tray bracket 1220 is secured to the base 1210 of the mounting pole 1214. The combination of these elements creates a mobile, easily adjustable, computer work stations. The adjustability features of the rolling cart assembly 1200 allow the mobile work station to be easily adjusted for standing and sitting work applications, providing the ability to maintain a 16-inch or other desired separation between the monitor and keyboard in any position. The support arm 224 and support arm 1014 may be positioned vertically for easy storage, ease of mobility and other considerations.

Figure 30:
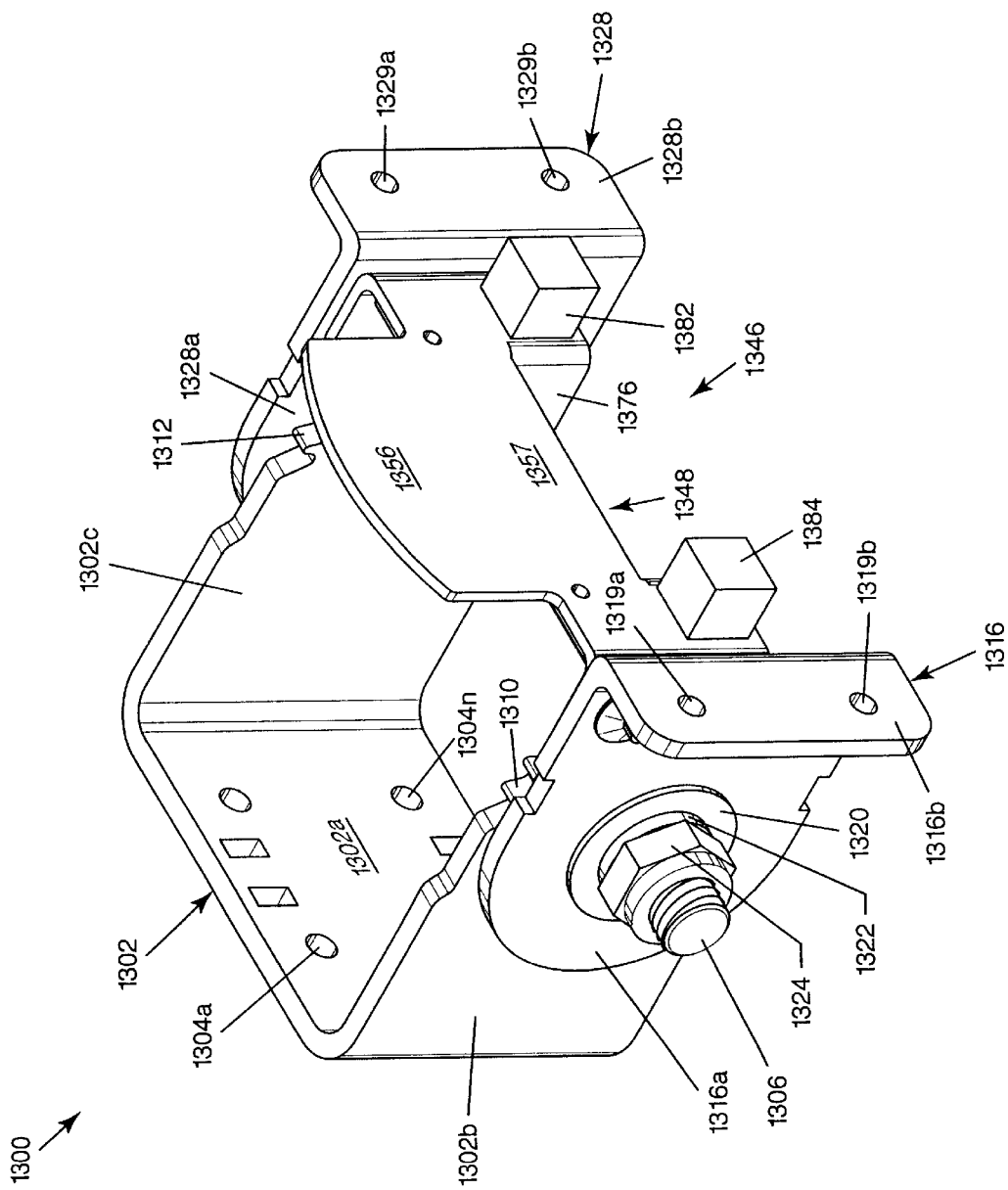
FIG. 30 illustrates an isometric view of a pivot/ratchet assembly useful as an alternative to certain ones of the pivoting structures of the various mounting systems illustrated in FIGS. 1, 12, 19, 20, 24, 25 and 29.

FIG. 30 illustrates an isometric view of a pivot/ratchet assembly 1300 which can be incorporated and utilized as an alternative for (a) the pivot assembly 34 for support of the flat panel display 16 of FIG. 2; (b) the single-axis pivot 230 for support of the flat panel display 216 of FIG. 13; (c) the single-axis pivot 430 for support of a flat panel display of FIG. 19; (d) the single-axis pivot 530 for support of the flat panel display 516 of FIG. 21; (e) pivot/brake assembly 1072 for support of the keyboard tray 1010 of FIG. 25; and (f) the support of any keyboard or keyboard tray, keyboard/mouse/trackball tray, flat panel or other display or any other device requiring pivotal support.

Figure 31:
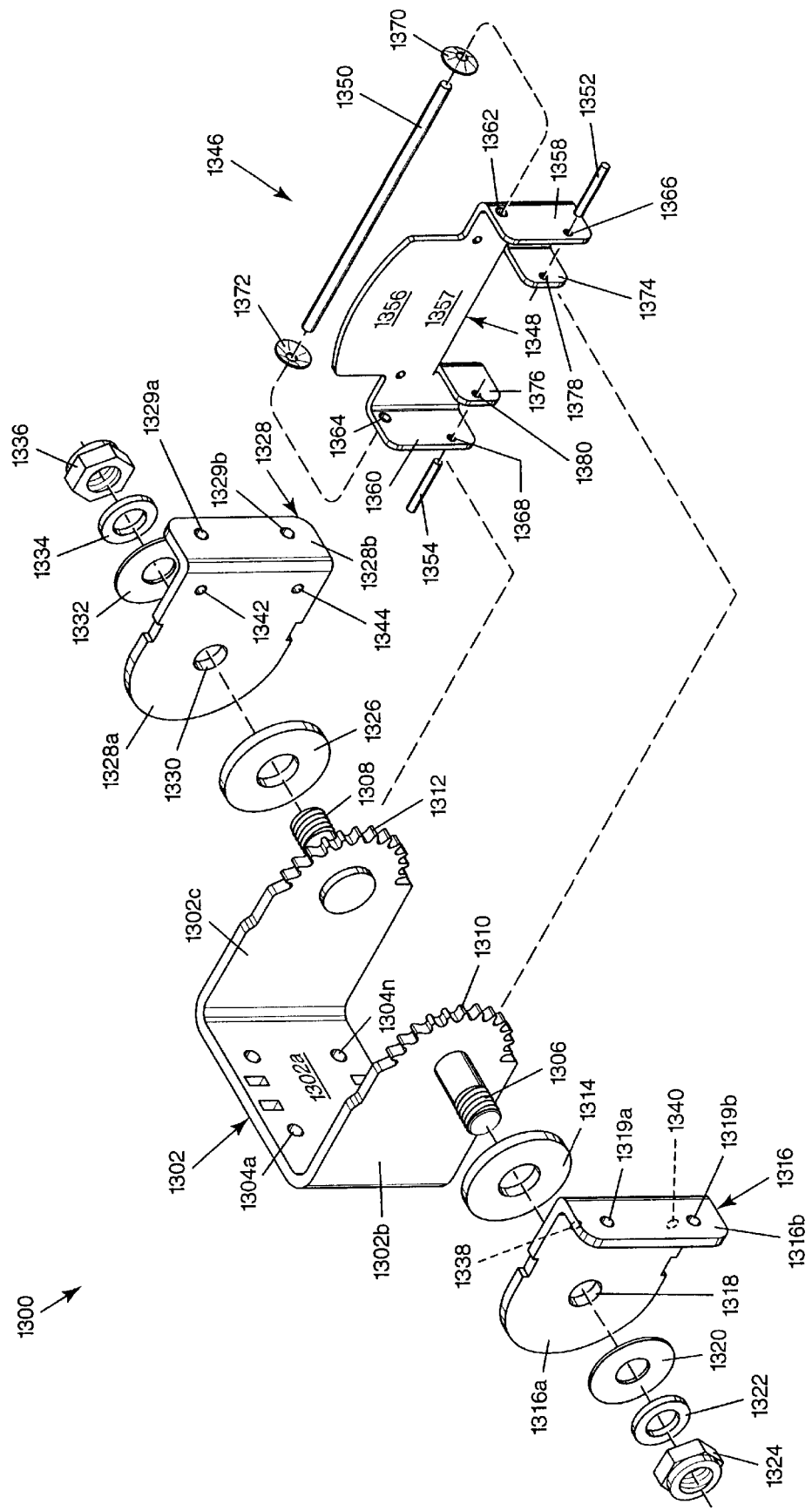
FIG. 31 illustrates an exploded isometric view of the pivot/ratchet assembly of FIG. 30.
Figure 32:
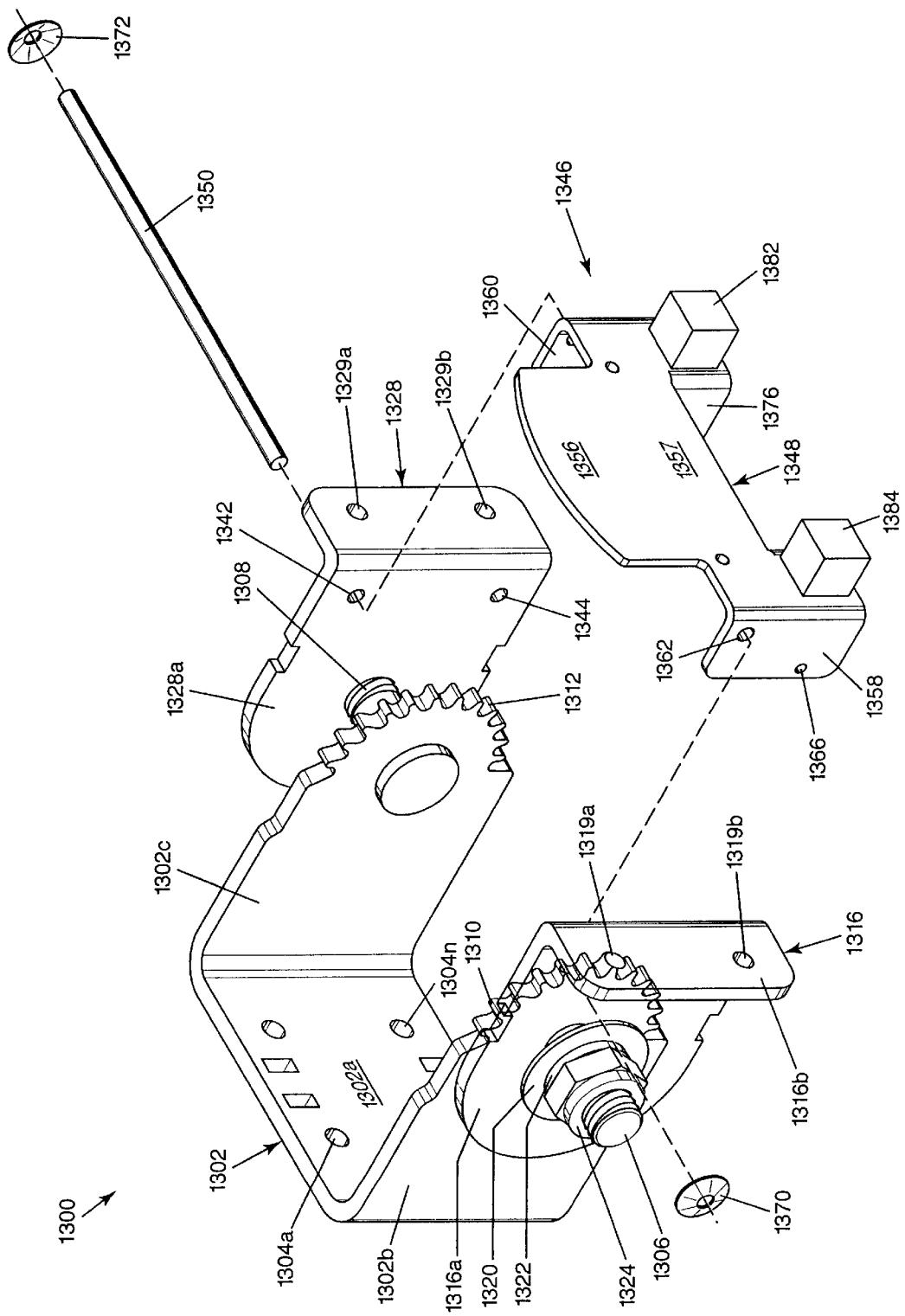
FIG. 32 illustrates an isometric view of the pivot/ratchet assembly of FIG. 30 in a partially assembled state.

With reference to FIGS. 30, 31 and 32 the structure of the pivot/ratchet assembly 1300 is now described where FIG. 31 illustrates an isometric exploded view and FIG. 32 illustrates an isometric view of a partially assembled pivot/ratchet assembly 1300. A U-shaped bracket 1302 is central to the pivot/ratchet assembly 1300 and includes a planar portion 1302a having a plurality of mounting holes 1304a–1304n. A left planar member 1302b and a right planar member 1302c extend at right angles from the planar portion 1302a. Threaded pivot studs 1306 and 1308 extend through and frictionally engage the left planar member 1302b and the right planar member 1302c, respectively. A semi-circular array of smoothed ratchet teeth 1310, whose radius center is co-located with the center of the pivot stud 1306, is located at one end of the left planar member 1302*b*. Another semi-circular array of smoothed ratchet teeth 1312, whose radius center is co-located with the center of the pivot stud 1308, is located at one end of the right planar member 1302*c*. In order, and with reference to FIG. 31, a UHMWPE washer 1314, an angle bracket 1316 having a large pivot hole 1318, a Belleville washer 1320, a thrust washer 1322, and a Nylock nut 1324 align and secure over and about the threaded pivot stud 1306. In the same fashion, a UHMWPE washer 1326, an angle bracket 1328 having a large pivot hole 1330, a Belleville washer 1332, a thrust washer 1334, and a Nylock nut 1336 align and secure over and about the threaded pivot stud 1308. Angle bracket 1316 includes a large planar member 1316*a*, one end of which is rounded, having an upper pivot hole 1338 and a lower hole 1340 in addition to the large pivot hole 1318 and also includes a small planar member 1316*b* extending perpendicular to the large planar member 1316*a*. Angle bracket 1328 includes a large planar member 1328*a*, one end of which is rounded, having an upper pivot hole 1342 and a lower hole 1344 in addition to the large pivot hole 1330 and also includes a small planar member 1328*b* extending perpendicular to the large planar member 1328*a*. Mounting holes 1319*a* and 1319*b* and mounting holes 1329*a* and 1329*b* are included in angle bracket small planar members 1316*b* and 1328*b*, respectively, for mounting to a keyboard tray such as keyboard tray 1010, previously illustrated, or, in the alternative, to a flat panel display.

A release lever assembly 1346 pivotally secures and aligns between the left angle bracket 1316 and the right angle bracket 1328 and interfaces with the semi-circular arrays of smoothed ratchet teeth 1310 and 1312. The release lever assembly 1346 includes a configured body member 1348 formed from a planar member and having a plurality of tabs extending at right angles from a lower central planar portion 1357 for the mounting of a pivot pin 1350 and roll pins 1352 and 1354. The substantially vertically aligned configured body member 1348 includes, coplanar with the central planar portion 1357, a release tab 1356 for manual release from the ratcheting feature which is described later in detail. A vertically aligned outer left tab 1358 and an opposing vertically aligned outer right tab 1360 extend at right angles from the central planar portion 1357. Pivot holes 1362 and 1364 are located in the upper regions of the outer left tab 1358 and the outer right tab 1360, respectively. Holes 1366 and 1368 are located in the lower region of the outer left tab 1358 and the outer right tab 1360, respectively. Pivot pin 1350 aligns through pivot holes 1362 and 1364 located in the upper regions of the outer left tab 1358 and the outer right tab 1360, respectively, as well as through respective holes 1338 and 1342 in the upper regions of angle brackets 1316 and 1328. Press-on nuts 1370 and 1372 frictionally engage the ends of the pivot pin 1350 to positionally fix the pivot pin 1350 in position. Opposing vertically aligned left and right inner tabs 1374 and 1376 extend at right angles from the lower central planar portion 1357 and include holes 1378 and 1380, respectively. Roll pin 1352 aligns in and frictionally engages holes 1366 and 1378 in the outer left tab 1358 and the inner left tab 1374, respectively. Roll pin 1354 aligns in and frictionally engages holes 1368 and 1380 in the outer right tab 1360 and the inner right tab 1376, respectively. Roll pins 1352 and 1354 engage the arrays of smooth ratchet teeth 1310 and 1312, respectively, the operation of which is described later in detail. Blocks of rubber, foam, plastic or other suitable resilient material 1382 and 1384, secure in a suitable fashion to the rearward lower planar surface of the central planar portion 1357 of the release lever assembly 1346 to provide positive spring-like pressure for forced engagement of the roll pins 1352 and 1354 with the semi-circular arrays of smoothed ratchet teeth 1310 and 1312, as later described in detail. Any suitable spring-like arrangement can be utilized for this function and shall not be construed to be limiting to the scope of the invention.

Figure 33:
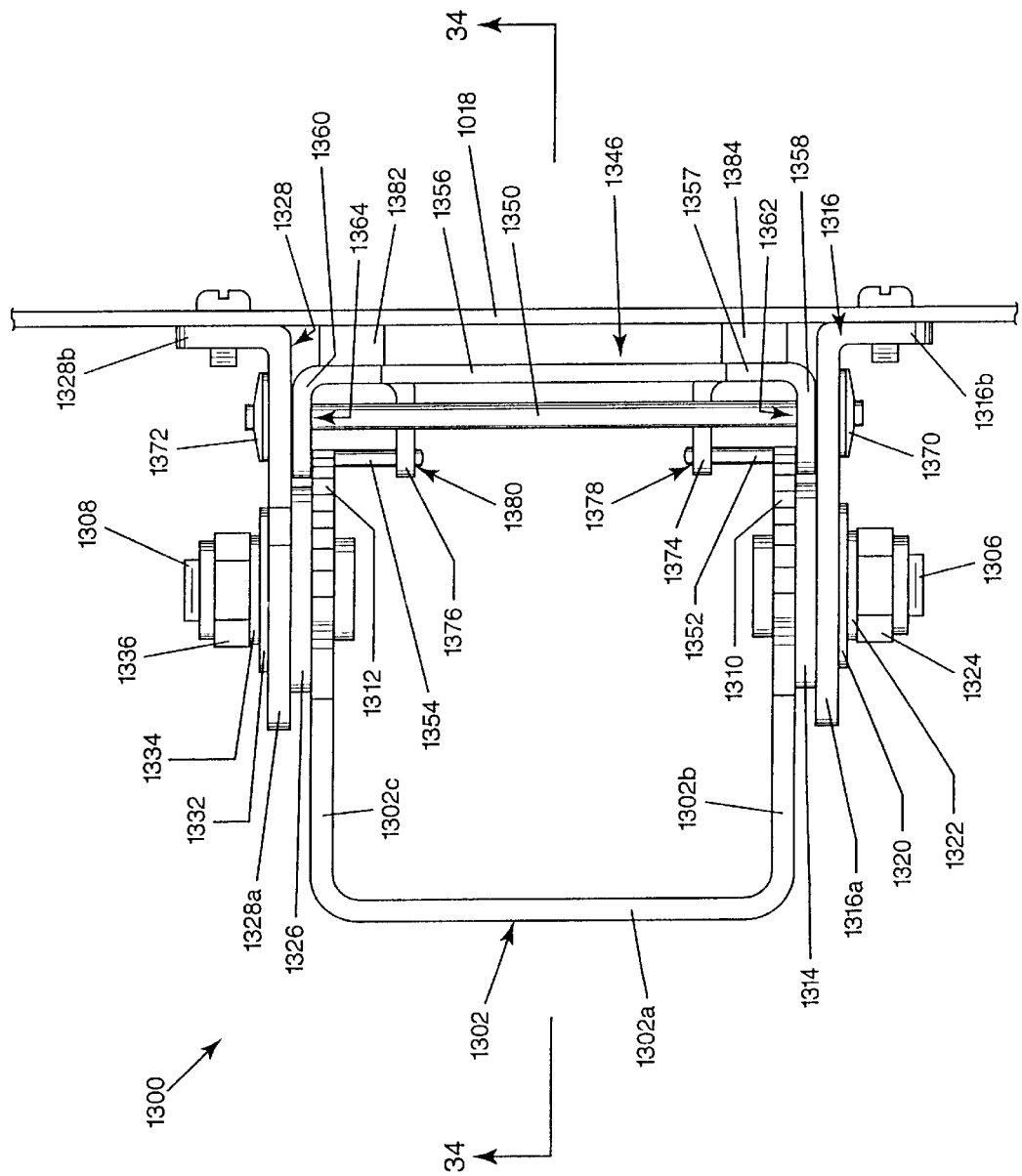
FIG. 33 illustrates a top view of the pivot/ratchet assembly of FIG. 30.

FIG. 33 illustrates a top view of the pivot/ratchet assembly 1300. Illustrated in particular is the alignment of the roll pins 1352 and 1354 in the release lever assembly 1346 with the smoothed ratchet teeth arrays 1310 and 1312 on the U-shaped bracket 1302.

Figure 34:
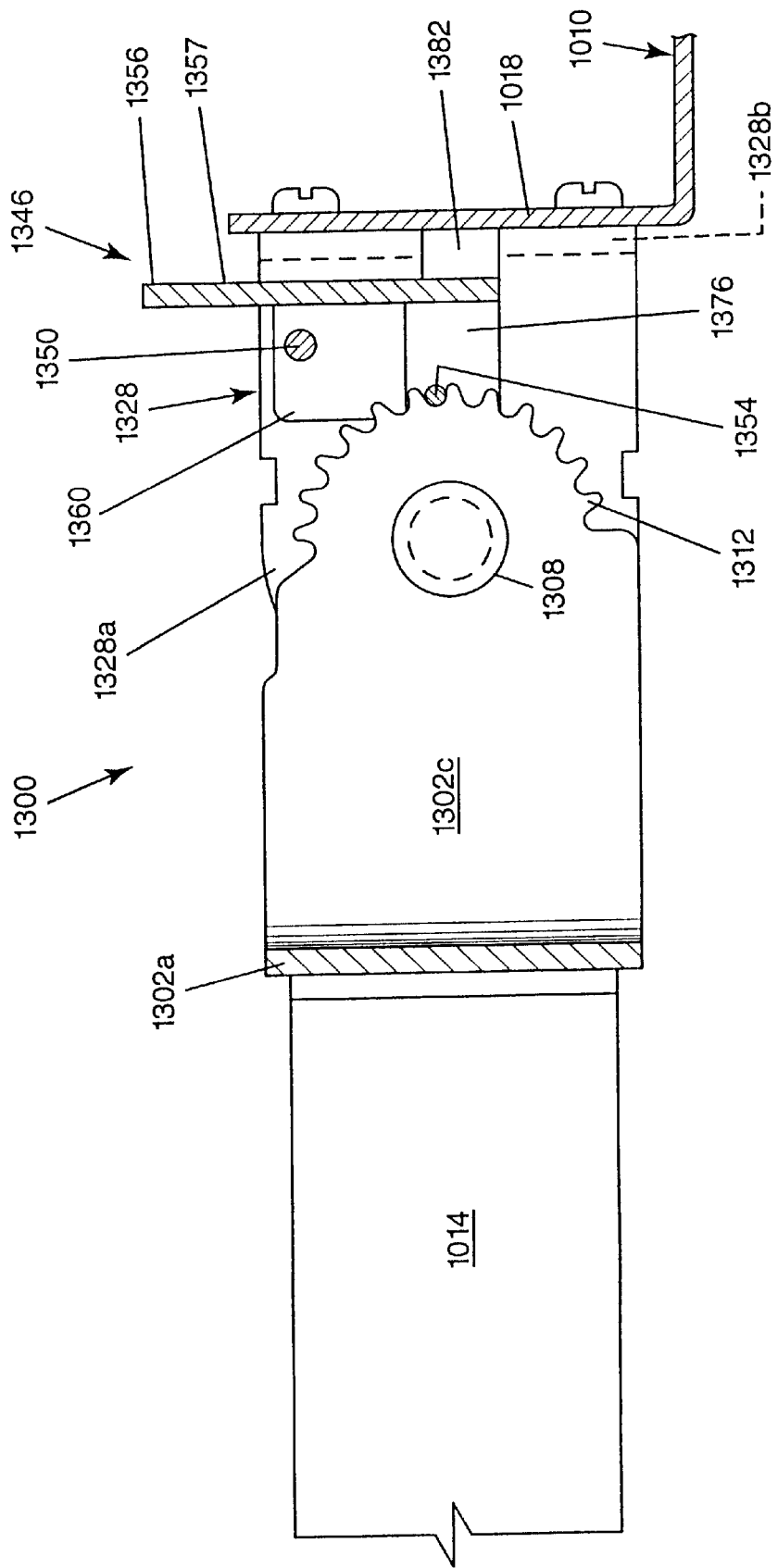
FIG. 34 illustrates a cross sectional view of the pivot/ratchet assembly taken along the line 34—34 of FIG. 33; and, FIG. 35 illustrates in detail the shape of the individual teeth of an array of smoothed ratchet teeth of the pivot/ratchet assembly.
Figure 35:
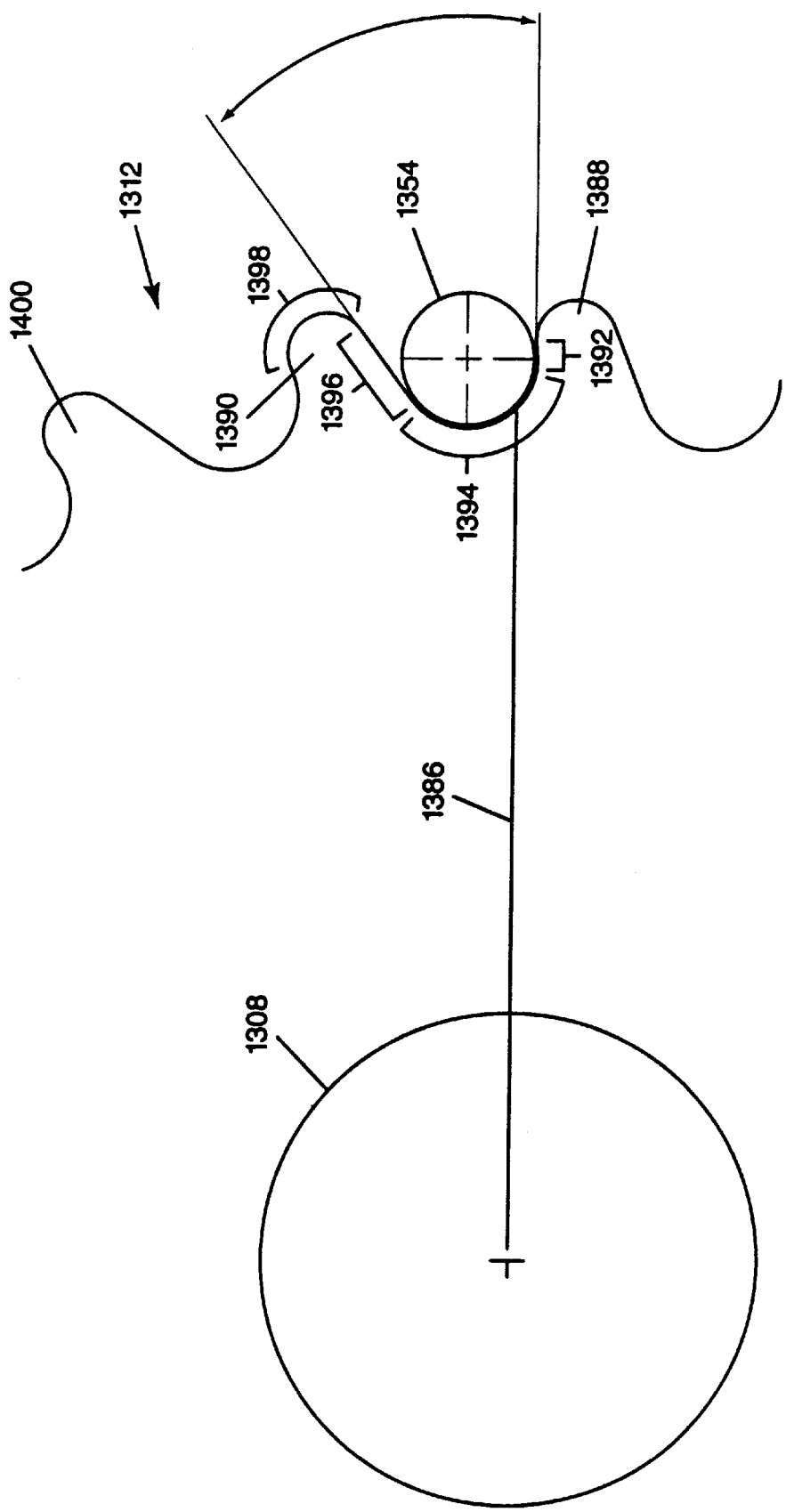

FIG. 34 illustrates a cross sectional view of the pivot/ratchet assembly 1300 along line 34—34 of FIG. 33. The relationship between the release lever assembly 1346 and the smoothed ratchet teeth array 1312 is described herein. The relationship between the release lever assembly 1346 and the smoothed ratchet teeth array 1310 is similar and is not described for purpose of brevity and clarity. The release lever assembly 1346 and an attached keyboard tray 1010 are supported by and pivot about pivot stud 1308 (and 1306) and are positionally held by interaction of the smoothed ratchet teeth array 1312 (and 1310) and roll pin 1354 (and 1352). The release lever assembly 1346 pivots either clockwise or counterclockwise about pivot pin 1350 to position the roll pin 1354 with respect to the smoothed ratchet teeth array 1312. Roll pin 1354, being part of the release lever assembly 1346, is forced and held in engagement between an angled and non-angled portion of ratchet teeth of the smoothed ratchet teeth array 1312, as shown in FIG. 35, by the spring-like action of the resilient rubber block 1382 and holds in position and prevents rotation of the release lever assembly 1346 and the attached keyboard tray 1010 and the angle bracket 1328 in a clockwise direction about the pivot stud 1308. Cantilever forces force the roll pin 1354 against the non-angled portion of a ratchet tooth of the smoothed ratchet teeth array 1312 for support of the release lever assembly 1346, the attached keyboard tray 1010, and angle bracket 1328.

Counterclockwise rotation of the release lever assembly 1346, the attached keyboard tray 1010, and the angle bracket 1328 about the pivot stud 1308 for upward angular displacemental adjustment of the keyboard tray 1010 is allowed and effected by manually grasping the outer end of the keyboard tray 1010 and lifting, thereby causing the roll pin 1354 to be forced, against the spring-like pressure exerted by the resilient rubber block 1382, along the angled portion of a ratchet tooth of the smoothed ratchet teeth array 1312, along and about the smoothed tooth end, and into a position between successive angled and non-angled teeth surfaces to a desired position.

Clockwise rotation about pivot stud 1308 to angularly displace the keyboard tray 1010 downwardly is effected by depressing the release tab 1356 to the left, against the spring-like pressure exerted by the resilient rubber block 1382, to pivot the release lever assembly 1346 about the pivot pin 1350 to remove the roll pin 1354 from influence of the smoothed ratchet teeth array 1312 to allow rotational freedom of the release lever assembly 1346, the attached keyboard tray 1010, and the angle bracket 1328 in a clockwise direction about the pivot stud 1308. Releasing of the release tab 1356 then causes the roll pin 1354 to again engage a position between adjacent angled and non-angled teeth surfaces to secure the release lever assembly 1346, the attached keyboard tray 1010, and angle bracket 1328 against further clockwise rotation.

Elevational rotation of the support arm 1014 about a pivot support bracket, such as pivotal support bracket 222, in combination with the pivotal positioning of the keyboard tray 1010 about the pivot/ratchet assembly 1300, as just previously described, offers a great degree of elevational and angular adjustment.

FIG. 35 illustrates in detail the shape of the teeth in the smoothed ratchet teeth array 1312. With reference to a horizontally aligned radius line 1386 the shape of the teeth is now described. Tooth 1388 includes a flat surface 1392 which is parallel to radius line 1386 upon which vertical forces from the keyboard tray 1010 are brought to bear through roll pin 1354 during static operation. Also, lateral forces caused by the resilient rubber block 1382 force the roll pin 1354 into the arced portion 1394 between teeth 1388 and 1390 during static operation. During upward keyboard adjustment, as previously described, the spring force of the resilient rubber block 1382 is overcome as roll pin 1354 is forced along and about the flat tooth surface 1396, which is angled or ramped with respect to the radius line 1386. The roll pin 1354 then traverses the arc surface 1398 at the end of tooth 1390 to be forced by the resilient rubber block 1382 between teeth 1390 and 1400. Smooth and quieted transition of a roll pin, such as roll pin 1354, between tooth ends is promoted by the use of an arced surface, such as arc surface 1398, instead of abrupt angled surfaces such as are found in other ratcheting devices. Also, less deflection of the roll pin 1354 and shorter actuation of the release lever assembly 1346 is required to transit between rounded teeth as opposed to using non-rounded teeth whose surfaces form a sharp angle.

Various modifications can be made to the present invention without departing from the apparent scope hereof.

We claim:

1. A pivot ratchet system comprising:
   a. a U-shaped bracket, said bracket having a first end and a second end, with a first ratchet array at said first end and a second ratchet array at said second end;
   b. a first pivot stud adjacent said first end and a second pivot stud adjacent said second end;
   c. a UHMWPE washer over each of said pivot studs;
   d. a first angled bracket over said first pivot stud and a second angled bracket over said second pivot stud and each of said pivot studs having a washer, a thrust washer, and a nut;
   e. a body member, said body member having a first pair of opposing tabs at a first end of said body member and said body member having a second set of opposing tabs at a second end of said body member;
   f. a first roll pin extending through said first pair of opposing tabs and a second roll pin extending through said second pair of opposing tabs; and
   g. a pivot pin defining a pivot axis, said pivot pin extending through one of said first pair of opposing tabs, one of said second pair of opposing tabs, said first angle bracket, and said second angle bracket, whereby said body member is capable of pivoting relative to said angled brackets about said pivot axis such that said first and second roll pins may be respectively reversibly engaged in said first and second ratchet arrays.

2. The pivot ratchet system of claim 1, further comprising:
   resilient means for forcing engagement of said roll pins in said rachet arrays.

3. The pivot ratchet system of claim 2, wherein said resilient means include a block of resilient material.

4. The pivot ratchet system of claim 1, wherein arrays include rounded teeth.

5. The pivot ratchet assembly of claim 1, wherein the body number further includes a release tab and wherein said release tab is arranged for manual pivoting of said body member to facilitate manual disengagement of said roll pins from said ratchet arrays.

6. A mounting system attachable to a vertical or horizontal surface, the mounting system being suitable for supporting a flat panel display, a keyboard, or other computer component, the mounting system comprising:
   a. a component mount suitable for supportingly engaging a display screen, keyboard, or other computer component;
   b. a pivoting bracket assembly comprising a tilt bracket attached to said component mount, said tilt bracket comprising:
      (1) at least two planar metal surfaces that rotatingly move with respect to each other;
      (2) at least one easy breakaway frictional polymer disk located between said at least two metal surfaces;
      (3) at least one spring washer located adjacent and outside an outer surface of said at least two metal surfaces;
      (4) said at least two metal surfaces, said at least one easy breakaway frictional polymer disk, and said at least one spring washer being held under tension by a nut and a bolt;
      (5) a pivot ratchet array on one of the at least two planar surfaces that rotatingly move with respect to each other; and,
      (6) a body member pivotally attached to the other of said at least two planar surfaces that rotatingly move with respect to each other, said body member having a pair of opposing tabs carrying a roll pin for reversibly engaging said ratchet array;
   c. a support arm with an inboard end and an outboard end and a central portion, said outboard end being attached to said pivoting bracket assembly;
   d. an arm elevation bracket attached to said inboard end of said support arm, said support arm being elevationally pivotable with said arm elevation bracket;
   e. a gas spring with an inboard end and an outboard end, said inboard end being pivotally and adjustably connected to said arm elevation bracket, and said outboard end being pivotally connected to said central portion of said support arm; and,
   f. a surface mount attached to said arm elevation bracket for mounting said mounting system to said vertical or horizontal surface.

7. The mounting system of claim 6, wherein said at least one easy breakaway frictional polymer disk has a similar static and dynamic coefficient of friction is fabricated from a material selected from a group consisting of taken from a group comprising ultra high molecular weight polyethylene (UHMWPE) and Delrin.

8. The mounting system of claim 6, wherein said at least one spring washer is a Belleville washer.

9. The mounting system of claim 6, wherein the adjustable connection of the inboard end of the gas spring allows the gas spring to be optimally positioned with respect to the arm elevational bracket such that the gas spring is capable of providing a dynamically changing counterbalance moment to the support arm corresponding to a changing moment force applied by the flat panel display as the support arm pivots on said arm elevation bracket.

10. The system of claim 6, wherein said gas spring is located within said support arm and is positionally connected to said elevation bracket to provide a dynamically changing counterbalance moment corresponding to an increasing or decreasing moment load as said support arm pivots about said elevation bracket.

11. The mounting system of claim 6, wherein said gas spring provides a counterbalance force to the support arm over a range of up to 180 degrees of motion of the support arm about the elevation bracket.

12. The mounting system of claim 6, wherein said gas spring comprises nitrogen.

13. The mounting system of claim 6, wherein said at least one breakaway frictional polymer disk is fabricated from UHMWPE such that a frictional force between said UHMWPE disk and said at least two planar metal surfaces prevents unforced rotational movement said of one planar metal surface with respect to the other planar metal surface and such that a low breakaway force exists between said at least two planar metal surfaces to provide ease of rotational movement of said one metal surface with respect to said other metal surface under a predetermined force.

14. The mounting system of claim 6, wherein said inboard end of said gas spring is pivotally connected to said arm elevation bracket at a position that is lower than the position of said inboard end of said support arm, wherein said gas spring provides a counterbalancing moment to support said computer component over an angular range of positions of said support arm about said arm elevational bracket.

15. The mounting system of claim 14, wherein said at least one easy breakaway frictional polymer disk has a similar static and dynamic coefficient of friction and is fabricated from a material selected a group consisting of ultra high molecular weight polyethylene (UHMWPE) and Delrin.

16. The mounting system of claim 14, wherein said at least one spring washer is a Belleville washer.

17. The system of claim 14, wherein said gas spring is located within said support arm and is positionally connected to said elevation bracket to provide a dynamically changing counterbalance moment corresponding to an increasing or decreasing moment load as said support arm pivots about said elevation bracket.

18. The mounting system of claim 14, wherein said s spring provides a counterbalance force to the support arm over a range of up to 180 degrees of motion of the support arm about the elevation bracket.

19. The mounting system of claim 14, wherein said at least one breakaway frictional polymer disk is fabricated from UHMWPE such that a frictional force between said UHMWPE disk and said at least two planar metal surfaces prevents unforced rotational movement of said one planar metal surface with respect to the other planar metal surface and such that a low breakaway force exists between said at least two planar metal surfaces to provide ease of rotational movement of said one metal surface with respect to said other metal surface under a predetermined force.

20. The mounting system of claim 19, wherein said at least one spring washer is a Belleville washer.

21. The mounting system of claim 19, wherein said gas spring is located within said support arm and is positionally connected to said elevation bracket to provide a dynamically changing counterbalance moment corresponding to an increasing or decreasing moment load as said support arm pivots about said elevation bracket.

22. The mounting system of claim 19, wherein said gas spring provides a counterbalance force to the support arm over a range of up to 180 degrees of motion of the support arm about the elevation bracket.

23. A mounting system attachable to a vertical or horizontal surface, the mounting system suitable for supporting a flat panel display, a keyboard, or other computer component, the mounting system comprising:
   a. a component mount, the component mount being suitable for supportingly engaging a display screen, keyboard, or other computer component;
   b. a pivoting bracket assembly comprising a tilt bracket attached to said component mount, said tilt bracket comprising:
      (1) at least two planar metal surfaces that rotatingly move with respect to each other;
      (2) at least one easy breakaway frictional polymer disk located between said at least two metal surfaces;
      (3) at least one spring washer located adjacent and outside an outer surface of said at least two metal surfaces;
      (4) said at least two metal surfaces, said at least one easy breakaway frictional polymer disk, and said at least one spring washer being held under tension by a nut and a bolt;
      (5) a pivot ratchet array on one of the at least two planar surfaces that rotatingly move with respect to each other; and,
      (6) a body member pivotally attached to the other of said at least two planar surfaces that rotatingly move with respect to each other, said body member having a pair of opposing tabs carrying a roll pin for reversibly engaging said ratchet array;
   c. a support arm with an inboard end and an outboard end and a central portion, said outboard end being attached to said pivoting bracket assembly;
   d. an arm elevation bracket attached to said inboard end of said support arm, said support arm being elevationally pivotable with said elevation bracket;
   e. said arm elevation bracket comprising:
      (1) at least two planar metal surfaces that rotatingly move with respect to each other;
      (2) at least one easy breakaway frictional polymer disk located between said at least two metal surfaces;
      (3) at least one spring washer located adjacent and outside an outer surface of said at least two metal surfaces;
      (4) said at least two metal surfaces, said at least one easy breakaway frictional polymer disk, and spring at least one spring washer being held under tension by a nut and a bolt; and,
      (5) said arm elevation bracket providing a frictional force to hold said support arm in place and yet provide a low repositioning force;
   f. a gas spring with an inboard end and an outboard end, said inboard end being pivotally connected to said arm elevation bracket, and said outboard end being pivotally connected to said central portion of said support arm, said gas spring providing a counterbalancing force to said support arm;
   g. a combination of both said gas spring and said frictional force of said elevation bracket providing for a counterbalancing force to said computer component and a frictional force providing positional stability; and,
   h. a surface mount attached to said arm elevation bracket for mounting said mounting system to said vertical or horizontal surface.

24. The mounting system of claim 23, wherein said at least one easy breakaway frictional polymer disk has a similar static and dynamic coefficient of friction is fabricated from a material selected a group consisting of ultra high molecular weight polyethylene (UHMWPE) and Delrin.

25. The mounting system of claim 23, wherein each of said at least one spring washer is a Belleville washer.

26. The mounting system of claim 23, wherein said inboard end of said gas spring is positionally connected at an optimal position to said arm elevation bracket and said arm elevation bracket is optimally angled to provide a linear counterbalancing force as said support arm is elevationally pivoted throughout its range of motion for the range of loads mountable on said support arm.

27. The system of claim 23, wherein said gas spring is located within said support arm and is positionally connected to said elevation bracket to provide a dynamically changing counterbalance moment corresponding to an increasing or decreasing moment load as said support arm pivots about said elevation bracket.

28. The mounting system of claim 23, wherein said gas spring provides a counterbalance force to the support arm over a range of up to 180 degrees of motion of the support arm about the elevation bracket.

29. The mounting system of claim 23, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

30. A mounting system, the mounting system being attachable to a vertical surface and suitable for supporting a flat panel display, the mounting system comprising:
  a. a component mount, the component mount being suitable for attachment to a flat panel screen;
  b. a pivoting bracket assembly comprising a tilt bracket attached to said component mount, said tilt bracket comprising:
    (1) at least two planar metal surfaces that rotatingly move with respect to each other;
    (2) at least one easy breakaway frictional polymer disk located between said at least two metal surfaces;
    (3) at least one spring washer located adjacent and outside an outer surface of said at least two metal surfaces;
    (4) said at least two metal surfaces, said at least one easy breakaway frictional polymer disk, and said at least one spring washer being held under tension by a nut and a bolt;
    (5) a pivot ratchet array on one of the at least two planar surfaces that rotatingly move with respect to each other; and,
    (6) a body member pivotally attached to the other of said at least two planar surfaces that rotatingly move with respect to each other, said body member having a pair of opposing tabs carrying a roll pin for reversibly engaging said ratchet array;
  c. a support arm with an inboard end and an outboard end and a central portion, said outboard end being attached to said pivoting bracket assembly;
  d. an arm elevation bracket attached to said inboard end of said support arm, said support arm being elevationally pivotable with said elevation bracket;
  e. a gas spring with an inboard end and an outboard end, said inboard end being pivotally connected to said arm elevation bracket, and said outboard end being pivotally connected to said central portion of said support arm; and,
  f. a surface mount attached to said arm elevation bracket for mounting said mounting system to said vertical surface.

31. The mounting system of claim 30, wherein said at least one easy breakaway frictional polymer disk has a similar static and dynamic coefficient of friction and is fabricated from the material selected a group consisting of ultra high molecular weight polyethylene (UHMWPE) and Delrin.

32. The mounting system of claim 30, wherein said at least one spring washer is a Belleville washer.

33. The mounting system of claim 30, wherein said gas spring is located within said support arm and is positionally connected to said elevation bracket to provide a dynamically changing counterbalance moment corresponding to an increasing or decreasing moment load as said support arm pivots about said elevation bracket.

34. The mounting system of claim 30, wherein said gas spring provides a counterbalance force to the support arm over a range of up to 180 degrees of motion of the support arm about the elevation bracket.

35. The mounting system of claim 30, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

* * * * *